US011944913B2

(12) United States Patent
Irwin, Jr. et al.

(10) Patent No.: US 11,944,913 B2
(45) Date of Patent: Apr. 2, 2024

(54) PRINTED DOCUMENTS READILY IDENTIFYING INDICIA PRINTING DEFECTS

(71) Applicant: IGT GLOBAL SOLUTIONS CORPORATION, Providence, RI (US)

(72) Inventors: Kenneth E. Irwin, Jr., Dawsonville, GA (US); Brian Ingram, Murphy, NC (US)

(73) Assignee: IGT Global Solutions Corporation, Providence, RI (US)

( * ) Notice: Subject to any disclaimer, the term of this patent is extended or adjusted under 35 U.S.C. 154(b) by 0 days.

(21) Appl. No.: 17/668,673

(22) Filed: Feb. 10, 2022

(65) Prior Publication Data

US 2023/0249055 A1 Aug. 10, 2023

(51) Int. Cl.

| | |
|---|---|
| ***A63F 3/06*** | (2006.01) |
| ***B41J 2/21*** | (2006.01) |
| ***B41M 3/14*** | (2006.01) |
| ***B42D 25/27*** | (2014.01) |

(52) U.S. Cl.

CPC .......... *A63F 3/0655* (2013.01); *A63F 3/0665* (2013.01); *B41J 2/2132* (2013.01); *B41M 3/14* (2013.01); *B42D 25/27* (2014.10); *A63F 2003/066* (2013.01)

(58) Field of Classification Search

CPC .................. A63F 3/0655; A63F 3/0665; A63F 2003/066; B42D 25/27

USPC .......................................................... 283/903

See application file for complete search history.

(56) References Cited

U.S. PATENT DOCUMENTS

| | | | | |
|---|---|---|---|---|
| 4,540,628 | A | 9/1985 | Oberdeck et al. | |
| 5,542,710 | A | 8/1996 | Silverschotz et al. | |
| 5,569,142 | A | 10/1996 | Snellman | |
| 5,704,647 | A | 1/1998 | Desbiens | |
| 5,803,504 | A | 9/1998 | Desbiens et al. | |
| 6,916,047 | B2 | 7/2005 | Jarvis et al. | |
| 6,939,627 | B2 | 9/2005 | Morizumi et al. | |
| 7,455,323 | B2 | 11/2008 | Taylor et al. | |
| 7,665,400 | B2 | 2/2010 | Duke | |
| 7,665,732 | B2 | 2/2010 | Stephens | |
| 7,712,741 | B2 | 5/2010 | Lambert | |
| 7,720,421 | B2 | 5/2010 | Snyder | |
| 8,074,570 | B2 | 12/2011 | Grotkowski et al. | |
| 8,342,576 | B2 | 1/2013 | Eschbach et al. | |
| 8,366,153 | B2 | 2/2013 | Martineck | |
| 8,883,390 | B1 | 11/2014 | Tyagi et al. | |
| 10,183,213 | B2 * | 1/2019 | Irwin, Jr. | A63F 3/0655 |
| 10,232,247 | B2 | 3/2019 | Finnerty et al. | |
| 10,377,162 | B2 | 8/2019 | Finnerty et al. | |

(Continued)

OTHER PUBLICATIONS

"Combined Search and Examination Report", from corresponding UK Patent Application No. GB2301568.8, dated Jul. 27, 2023.

*Primary Examiner* — Kyle R Grabowski
(74) *Attorney, Agent, or Firm* — Neal, Gerber & Eisenberg LLP

(57) ABSTRACT

A printed security-enhanced document, printing method, and system for ensuring that any printing defects present in the variable indicia also occur in the background on the document protected. By ensuring that random printing defects in the variable indicia also appear in the same document's background, detection of the printing defects becomes more readily apparent.

7 Claims, 30 Drawing Sheets
(28 of 30 Drawing Sheet(s) Filed in Color)

(56) References Cited

U.S. PATENT DOCUMENTS

| | | | |
|---|---|---|---|
| 10,543,712 | B2 | 1/2020 | Behm et al. |
| 10,752,035 | B2 | 8/2020 | Finnerty et al. |
| 2017/0106271 | A1 | 4/2017 | Finnerty et al. |
| 2019/0151749 | A1 | 5/2019 | Irwin et al. |
| 2019/0152245 | A1* | 5/2019 | Finnerty ................ B41J 2/2139 |
| 2021/0322863 | A1 | 10/2021 | Irwin |

* cited by examiner

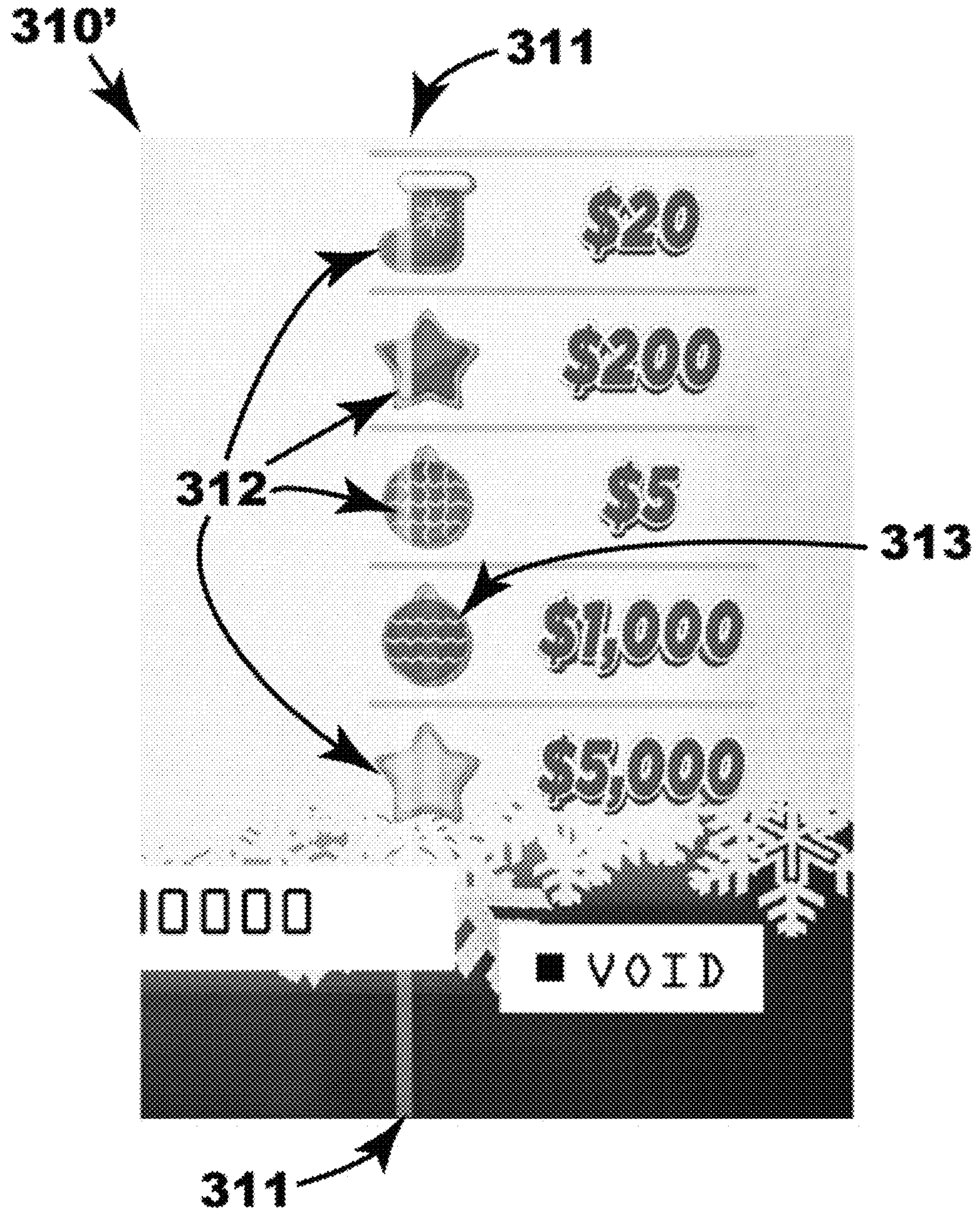
FIG. 3B1

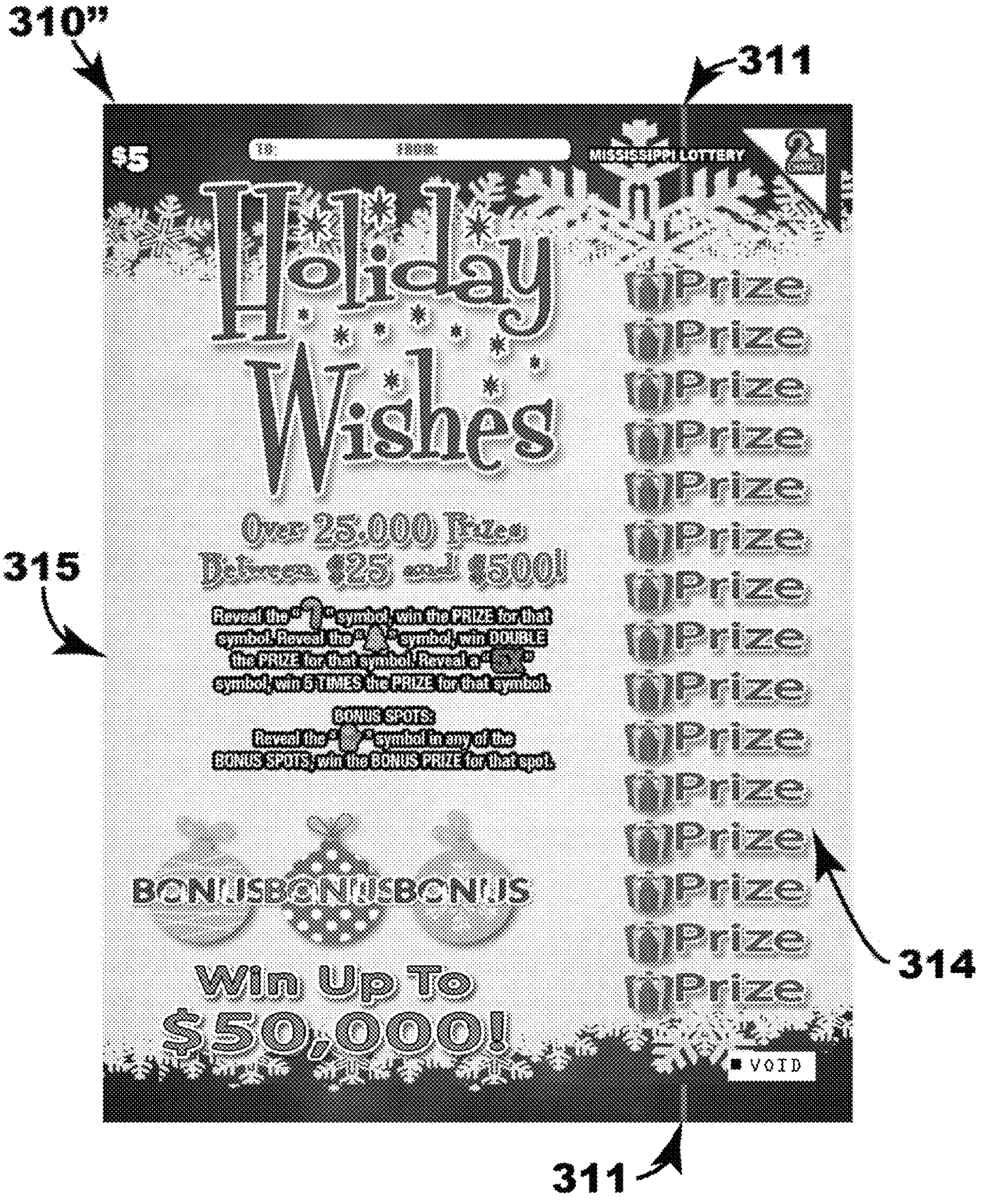
FIG. 3B2

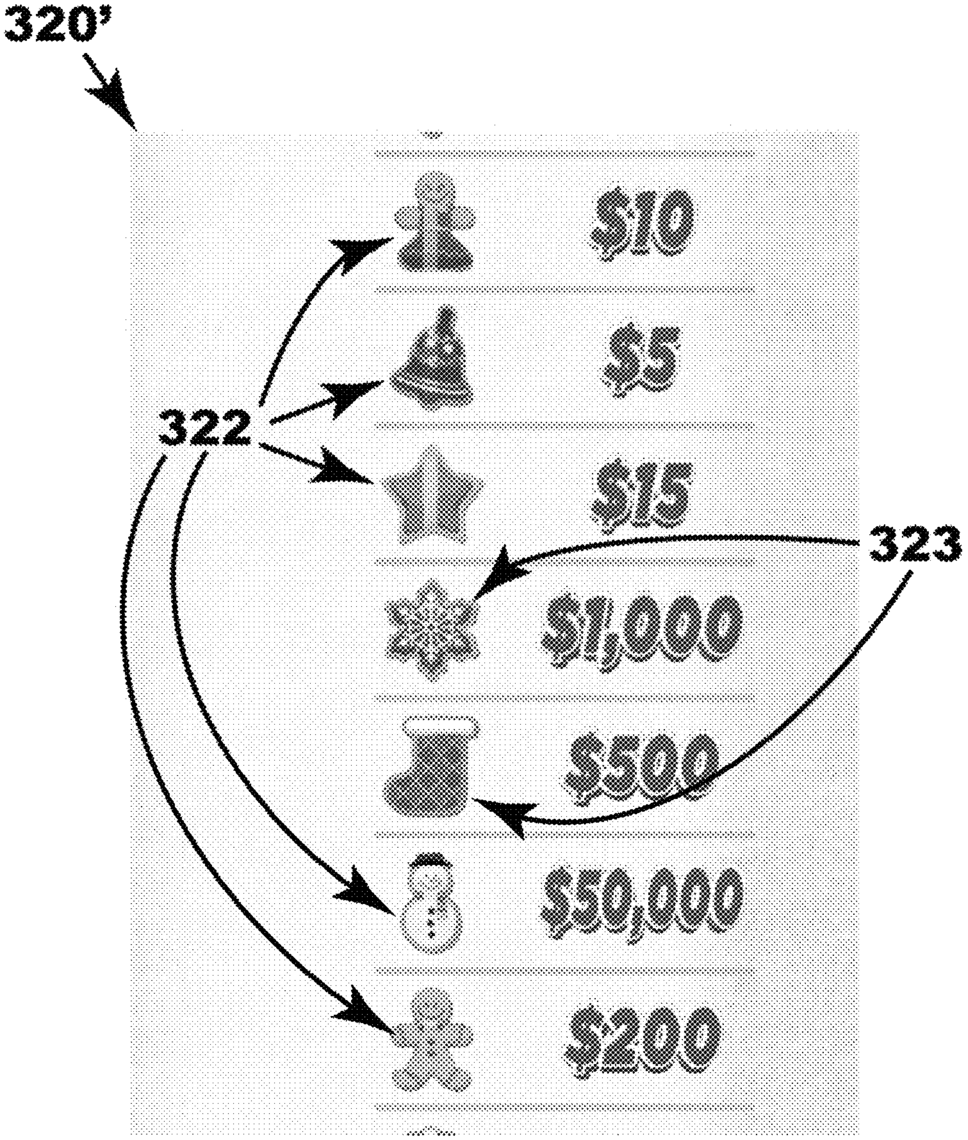
FIG. 3C1

FIG. 3C2

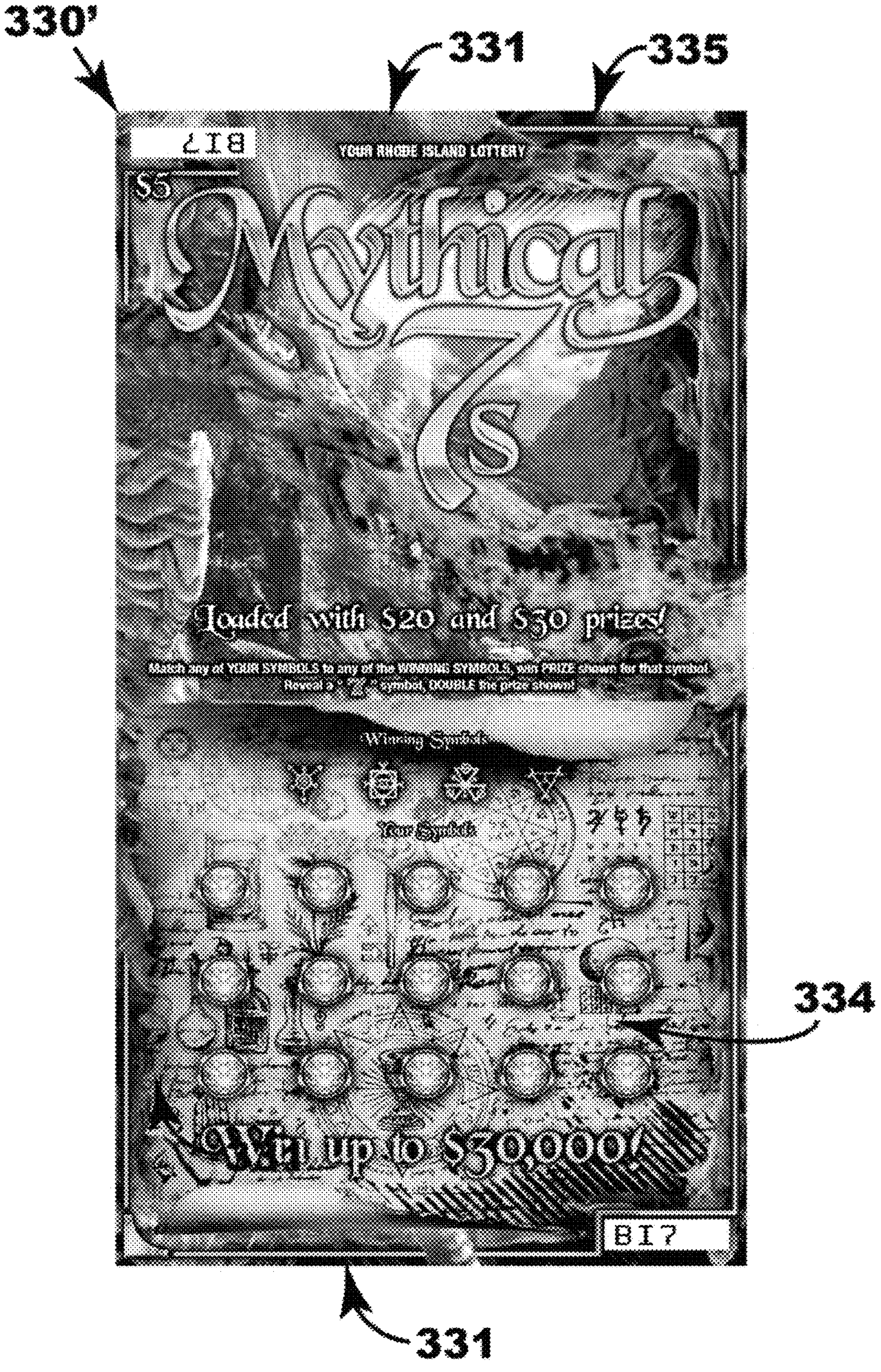
FIG. 3D1

FIG. 3E1

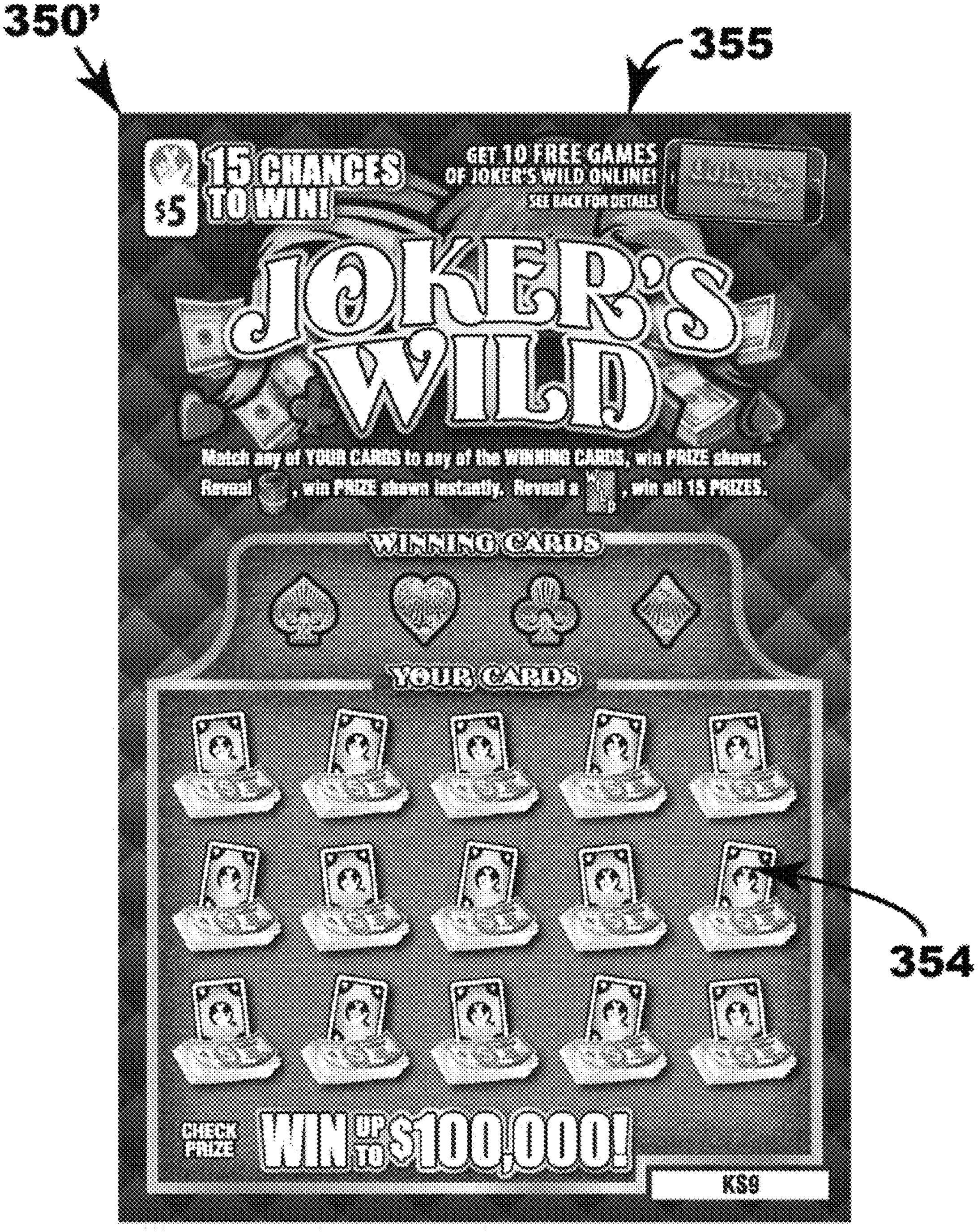
FIG. 3F1

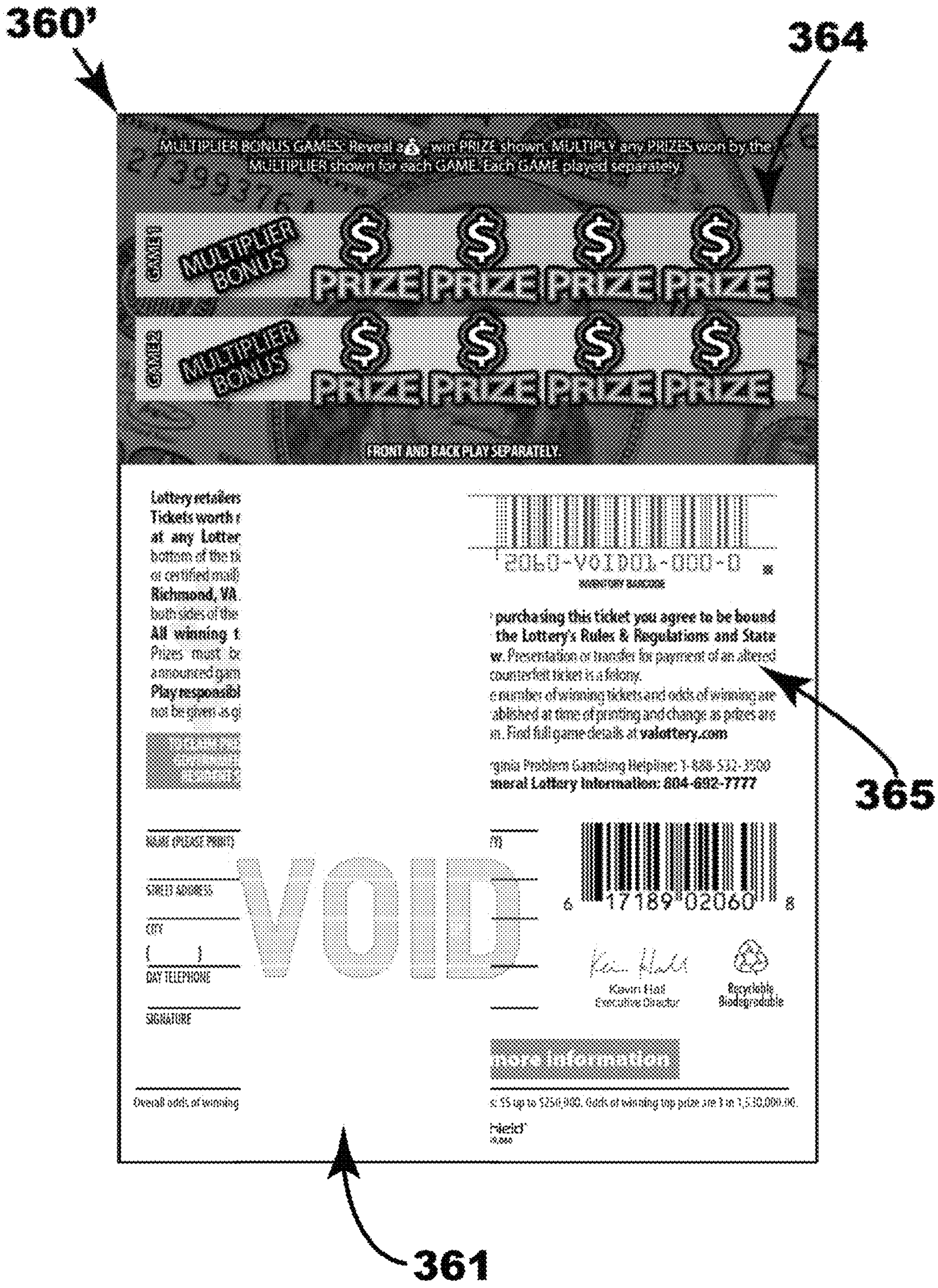
FIG. 3G1

PRINTED DOCUMENTS READILY IDENTIFYING INDICIA PRINTING DEFECTS

BACKGROUND

The present disclosure relates generally to documents, such as instant lottery tickets, having variable indicia under a Scratch-Off Coating (SOC). More specifically, the present disclosure relates to systems, methods, and devices for readily identifying printing defects that can occur with variable indicia on such documents.

Scratch-off instant lottery ticket games have become a time-honored method of raising revenue for state and federal governments the world over. The concept of hiding variable indicia information under a SOC has also been applied to numerous other products such as commercial contests, telephone card account numbers, gift cards, etc. Literally, tens of billions of scratch-off products are printed every year where the SOCs are used to ensure that the product has not been previously used, played, or modified. The variable indicia may be printed using a specialized high-speed ink jet printer or imager with a water-soluble dye or pigment. The variable indicia may, for example, be monochromatic black or monochromatic red in color, and each type of variable indicia may be imaged as a discrete spot (i.e., monochromatic) or a process color. This use of single spot color printing for variable indicia imaging can be problematic due to the spot color inkjet heads partially clogging such that a portion of the variable indicia prints while one or more other portions do not print, as further described below.

BRIEF SUMMARY

In various embodiments, the present disclosure relates to a document such as a lottery ticket including a substrate, variable indica printed on a first area of the substrate, the variable indica having at component color printing error, and a background printed on a second area of the substate, the background having the same color component printing error.

In various embodiments, the present disclosure relates to a document such as a lottery ticket including a lottery ticket including a substrate, variable indica printed on a first area of the substrate, the variable indica comprising at least one first component color printed by a first printer, and a background printed on a second area of the substate, the background comprising a plurality of component colors including the at least one first component color printed by the first printer.

In various embodiments, the present disclosure relates to a document such as a lottery ticket including a substrate, variable indica printed on a first area of the substrate, the variable indica comprising a first plurality of different component colors comprising a first process color printed by a first printer, a scratch off coating covering the variable indicia, and a display background printed on a second area of the substate, the display background comprising a plurality of different component colors comprising the first process color printed by the first printer, wherein the display background is not covered by any scratch off coating.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

FIGS. 3B, 3B1, and 3B2 are front views (with and without the SOC) and a fragmentary magnified front view of a first representative example of an instant lottery ticket of one example embodiment of the present disclosure showing process color variable indicia exhibiting a simulated misprint caused by a magenta component color failing to print on a portion of the lottery ticket's surface with the process color display and base backgrounds also exhibiting similar failures caused by the same magenta component color's failure to print in similar portions of the lottery ticket.

FIGS. 3C, 3C1, and 3C2 are front views and a fragmentary magnified front view of the instant lottery ticket of FIG. 3B with its process color variable indicia exhibiting a simulated misprint caused by a cyan component color failing to print with the process color display and base backgrounds not exhibiting any printing failures since the failed cyan process component color is not embodied in the display or base background portions of the lottery ticket.

FIGS. 3D and 3D1 are front views (with and without the SOC) of a second representative example of an instant lottery ticket of another example embodiment of the present disclosure, showing process color variable indicia exhibiting a simulated misprint caused by a cyan component color failing to print on a portion of the lottery ticket's surface with the process color display and base backgrounds also exhibiting similar failures of the cyan component color to print on similar ticket areas.

FIGS. 3E and 3E1 are front views (with and without the SOC) of the second representative example instant lottery ticket of FIG. 3D with its process color variable indicia exhibiting a simulated misprint caused by a yellow component color failing to print a portion of the lottery ticket's surface with the process color display and base backgrounds also exhibiting similar failures of the yellow component color to print on similar ticket areas.

FIGS. 3F and 3F1 are front views (with and without the SOC) of a third representative example of an instant lottery ticket of another example embodiment of the present disclosure showing process color variable indicia exhibiting a simulated misprint caused by a magenta component color failing to print on a portion of the lottery ticket's surface with the process color base background hidden under the SOC also exhibiting a similar failure of its magenta component color to print on a similar ticket area.

FIGS. 3G and 3G1 are rear views (with and without the SOC) of the back of a fourth representative example of an instant lottery ticket of another example embodiment of the present disclosure, showing monochromatic variable indicia exhibiting a simulated misprint on a display background portion of the lottery ticket's surface with the monochromatic instructions portion also exhibiting a similar failure on a similar ticket area.

DETAILED DESCRIPTION

Figure 1A:
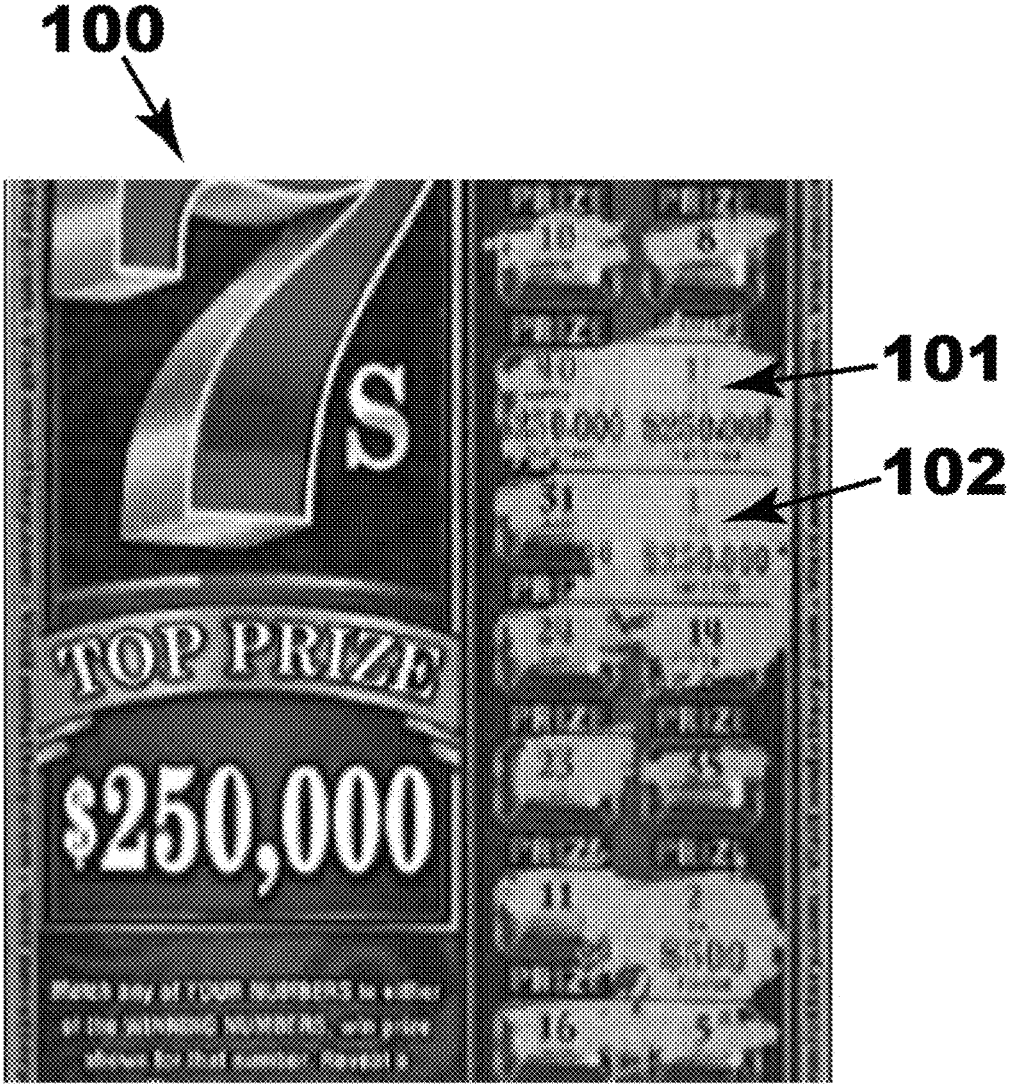
FIG. 1A PRIOR ART
FIG. 1A is a front view of an actual instant lottery ticket from the New Mexico Lottery that has a misprint.

Certain terminology is used herein for convenience only and is not to be taken as a limitation on the present disclosure.

The words "image" or "print" generally refer to images, symbols, indicium, indicia, etc. created or formed directly or indirectly on any substrate or surface by any imaging or printing method or equipment. Creating or forming such "images" or "print" is generally refer to a method of "imaging" or "printing."

The terms "instant ticket", "ticket", and/or "document" are generally used to refer to "lottery scratch-off ticket", "instant lottery ticket", "commercial contest scratch ticket", "telephone card account number card", "scratch-off gift cards", or a "scratch-off card."

The term "component color" generally refers to an individual color that can be used with at least one other component color to create a combined "process" color.

The term "spot color" or "monochromatic color" generally refers to a color that is intended to be printed and displayed by itself and not necessarily intended to be utilized as a "process color" in that particular application. An example of two spot colors are provided in FIG. 1B and includes red as indicated by numerals 103 and 104 and black as indicated by numerals 105 and 106 "spot colors."

The terms "full-color" and "process color" generally refers to producing a variety of colors by discrete combinations of applications of primary inks or dyes. For example, "CMY" (i.e., Cyan, Magenta, Yellow) are the standard primary component colors with a vast assortment of process colors possible through various combinations of these three primary component colors, "CMYK" (i.e., Cyan, Magenta, Yellow, and blacK) adds the component color black to the three primary component colors to produce darker process colors, or in some cases six colors (e.g., Hexachrome printing process uses CMYK inks plus Orange and Green inks) are used to create a larger process color gamut, or alternatively eight colors for an even larger process color gamut—e.g., CMYK plus lighter shades of cyan (LC), magenta (LM), yellow (LY), and black (YK).

The term "variable" indicium or indicia generally refers to indicium indicia which can vary from document to document and thus can, for example, vary the value of the document. For example, a lottery ticket, coupon, commercial game piece or the like, can include variable indicium or indicia hidden by a SOC until authorized to be seen, such as by a purchaser of the document who scratches off the SOC, revealing the variable indicium or indicia. Examples of variable indicia include without limitation letters, numbers, icons, symbols, and/or figures.

The term "background" generally refers to the area(s) of the document that is not covered by variable indicia. Depending on the context, the "background" can be either on the front or back side of the document or both. The term "display background" generally refers to the area of the document that is visible while none of the SOC has been removed (or in other words, the area(s) of the document not covered by any SOC). Examples of "display backgrounds" can be found in FIG. 2A callout 201, FIG. 2C callout 221, and FIG. 2E callout 243. The term "base background" refers to the area of the document covered by SOC adjacent to the variable indicia. Examples of "base backgrounds" can be found in FIG. 3A callouts 301 and 301'.

Before describing the present disclosure, it may be useful to further explain example printing and quality control problems, to explain certain known SOC protected instant lottery ticket construction, and to ensure that a common lexicon is established prior to a more detailed explanation of the present disclosure. As mentioned above and further described below, various printing errors have occurred and have caused a portion of the variable indicia to print while one or more other portions did not print. Example printing errors are described in relation to FIGS. 1A thru 1E. Additionally, example instant ticket construction is described in relation to FIGS. 2A thru 2G.

Figure 1B:
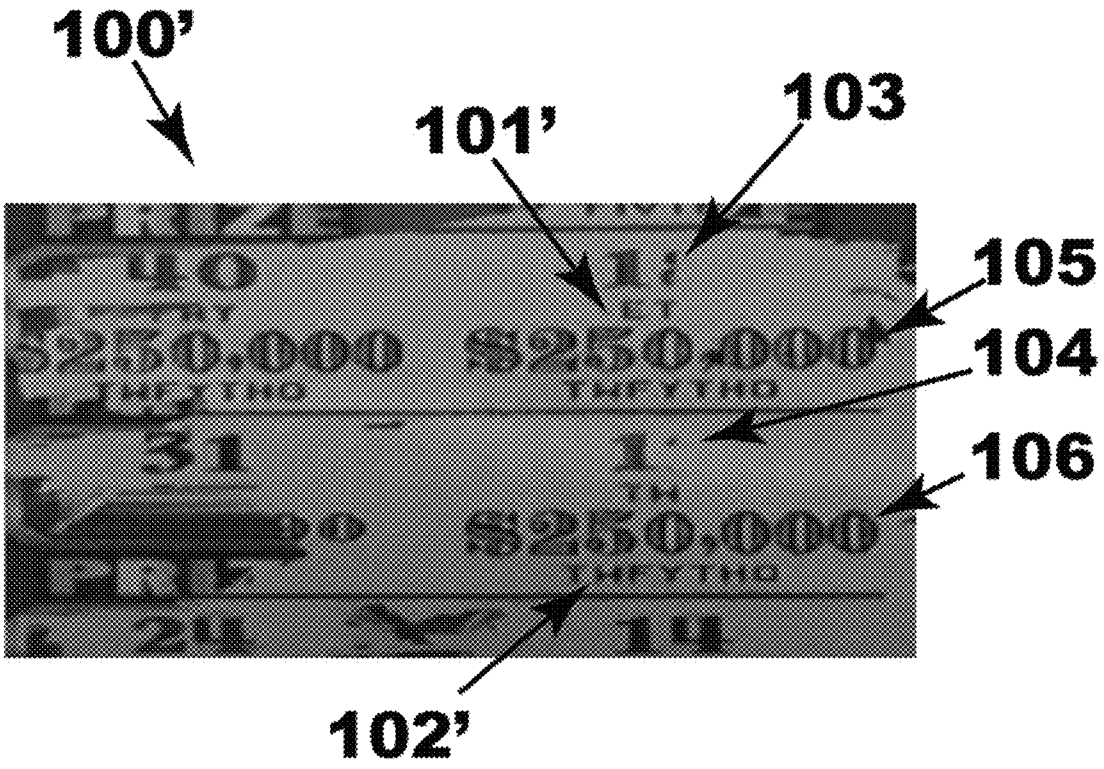
FIG. 1B PRIOR ART
FIG. 1B is a magnified front view of the misprinted portion of the instant lottery ticket of FIG. 1A.

In one example, in January 2015, a Roswell, New Mexico lottery player believed he won $500,000 in a "Ruby 7s" instant ticket key number match lottery game. As illustrated in FIGS. 1A and 1B, the lottery player believed that he was holding a winning ticket 100 (and 100' which is a magnified view of part of the ticket 100) because the key number match indicium was "1" and the lottery ticket misprint made the intended indicia numbers of "18" and "13" appear to be two occurrences of the winning key match number "1" as indicated by numerals 101 and 102 of FIG. 1A and 101' and 102' of FIG. 1B (i.e., two $250,000 winners). In this case, the intended second indicia digits "8" and "3" indicated by numerals 103 and 104 respectively barely appeared on the ticket 100 as best shown by magnified ticket 100' of FIG. 1B.

The perceived winning ticket 100 (and 100') thus had two misprints due to a partially clogged red inkjet print head causing both of the second indicia digits "8" and "3" to barely appear as indicated by numerals 103 and 104. With this particular misprinted ticket 100 (and 100'), the two associated winning amount indicia 105 and 106 were printed via a separate black inkjet imager head that was not clogged. Thus, the ticket had an appearance of the winning amounts—i.e., "$250,000" appearing twice. In other words, even though two separate spot colors (i.e., red and black) were employed to print the variable indicia for ticket 100 (and 100'), the failure of the one red printhead was sufficient to create the appearance of a $500,000 winning lottery ticket.

Figure 1C:
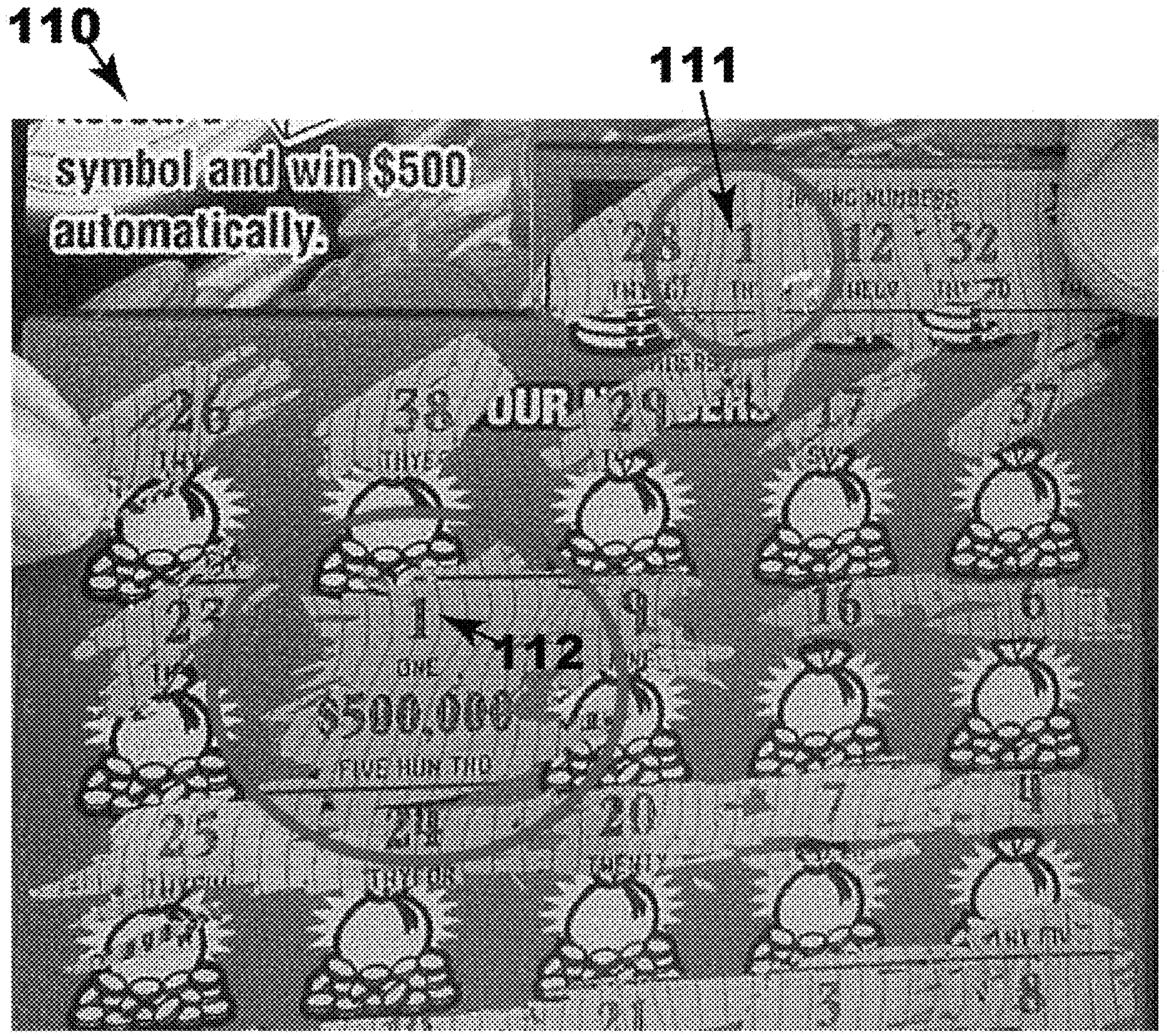
FIG. 1C PRIOR ART
FIG. 1C is a front view of an actual instant lottery ticket from the Florida Lottery that has a misprint.

A similar $500,000 misprint due to clogged inkjet heads occurred with a Florida Lottery ticket as shown in FIG. 1C. In this case, the lottery ticket holder filed a lawsuit against the Florida lottery after they were told their apparent winning ticket was a misprint. In this case of the Florida Lottery, the misprinted ticket 110 displayed misprinted key match indicium 111, which when matched to game indicium 112 readily appeared to be a $500,000 winner. There are many other documented cases of instant lottery ticket misprints due to clogged inkjet imager heads.

The United States and Canadian lottery instant ticket market was approximately $55 billion in 2020. Assuming the average instant ticket price is $2.70, this equates to over 20 billion instant tickets printed per annum in 2020 for the United States and Canadian markets. Consequently, with the extremely high quantities of instant tickets printed per annum, any single point of failure (e.g., inkjet print nozzles) may unsurprisingly result in misprints, no matter how diligent the Quality Assurance (QA) program employed by an instant lottery ticket provider. For example, a Six Sigma (6σ) process is the gold standard of manufacturing process control in which 99.99966% of all opportunities to produce some feature of a part are statistically expected to be free of defects. With the vast numbers of instant lottery tickets printed each year a Six Sigma (6σ) process for ensuring correctly printed indicia could theoretically still produce 68,000 defective lottery tickets per annum. Therefore, even employing extremely stringent Six Sigma (6σ) QA processes, a large number of indicia defects could potentially occur and result in instant lottery tickets with misprinted values.

Figure 1D:
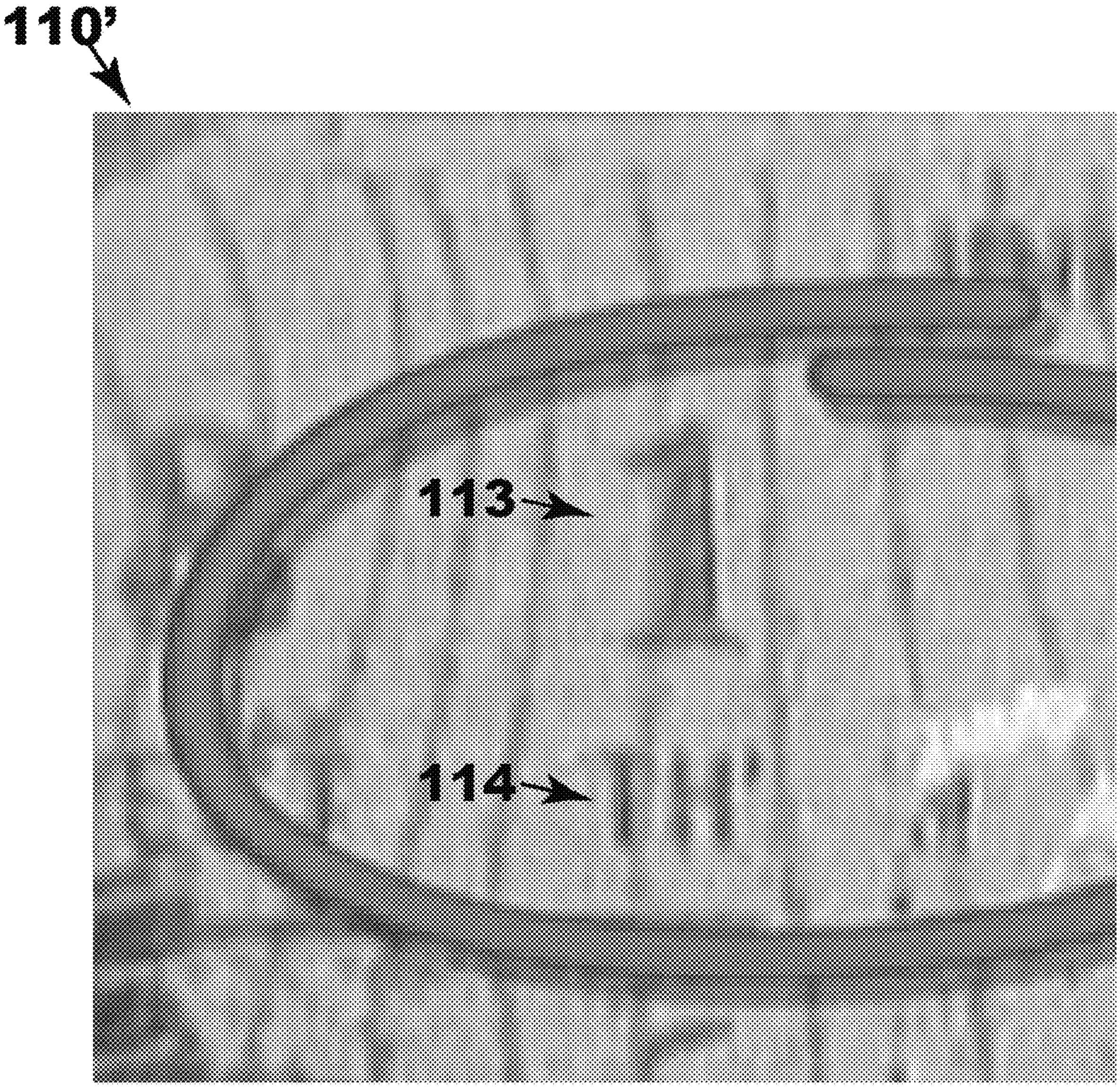
FIG. 1D PRIOR ART
FIG. 1D is a magnified front view of the instant lottery ticket of FIG. 1C.

Lottery ticket manufacturers have tried to address the problem of clogged lottery inkjet misprints such as by adding captions and/or using automated press monitoring systems. For example, FIG. 1D shows a magnification of a Florida ticket 110' misprinted key match indicia 113 and associated abbreviated caption 114. The above described New Mexico Lottery misprinted ticket 100 and 100' of FIGS. 1A and 1B and the Florida Lottery misprinted ticket 110 and 110' of FIGS. 1C and 1D were both printed with the support of an automatic press monitoring system that did not catch these misprints.

Figure 1E:
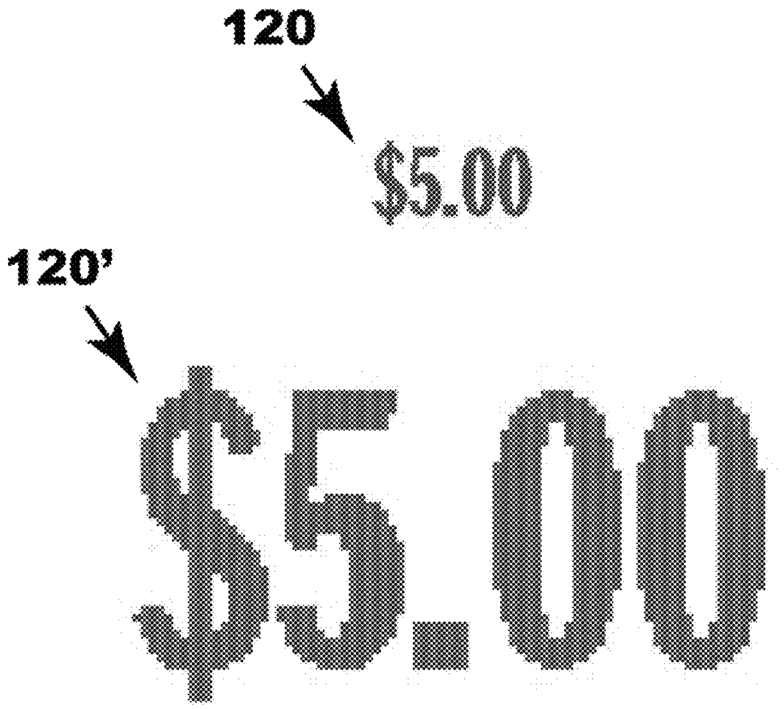
FIG. 1E PRIOR ART
FIG. 1E shows a front view and a magnified front view of a known variable indicia redundancy for an instant lottery ticket provided by component colors printed in a non-overlapping manner.

Certain other methods for mitigating false perceptions of misprinted indicia have been proposed. In one proposed method, variable indicia printed redundancy is achieved by imaging component colors in a non-overlapping manner such as shown in FIG. 1E, including the indicia 120 (and 120' in magnified view). In another proposed method, variable indicia printed redundancy is achieved by printing the variable indicia with process colors. Since process colors can include two, three, four, or more different separate component colors (e.g., Cyan, Magenta, Yellow, and blacK— a.k.a. "CMYK") with each component color applied by a separate print head, so long as at least two different component colors are utilized to print each process color variable indicum, the redundancy of print heads will provide redundancy of printed indicia assuming each component color is legible if printed individually. While these proposed methods can be effective, the printing errors are confined to the variable indicia and therefore often not detectable before the lottery ticket is distributed and sold. In other words, the printing error is confined to the variable indicia and consequently covered by the SOC on un-played tickets.

Figure 2A:
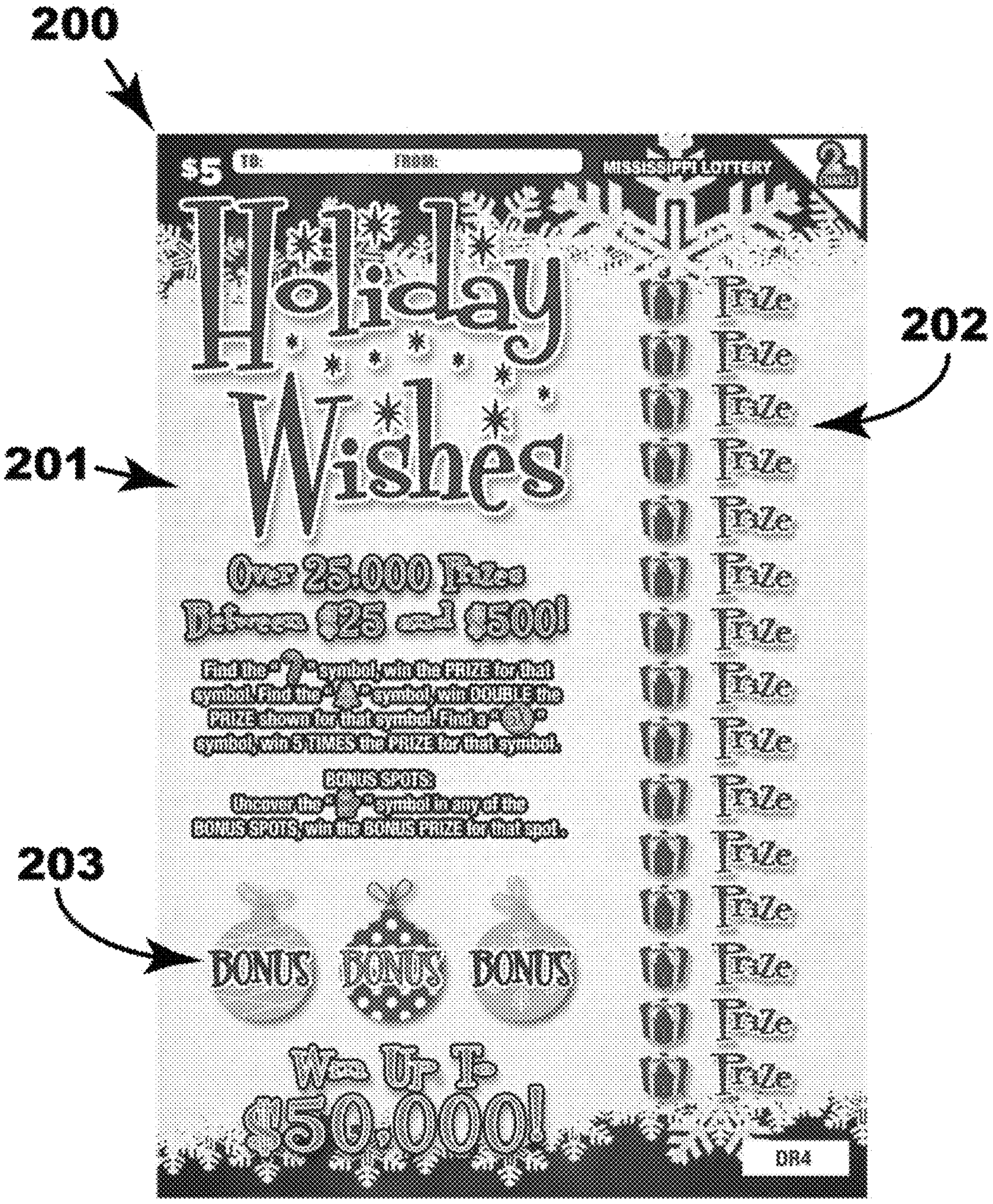
FIG. 2A PRIOR ART
FIG. 2A is a front view of a first known instant lottery ticket illustrating the front of the instant lottery ticket before the SOC is removed.
Figure 2B:
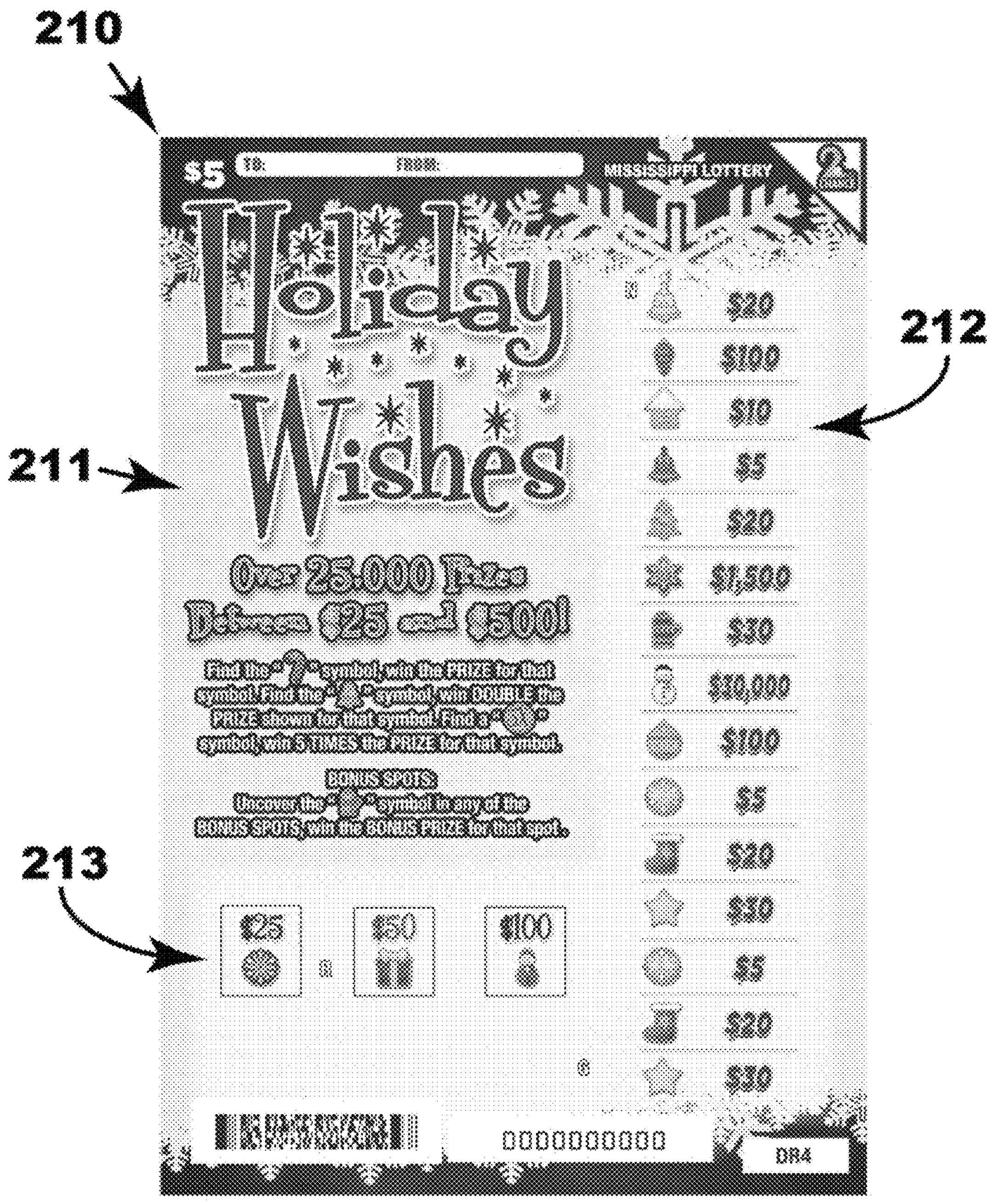
FIG. 2B PRIOR ART
FIG. 2B is a front view of the first known lottery ticket of FIG. 2A illustrating the front of the instant lottery ticket after the SOC is removed and thereby revealing the process color variable indicia.

FIG. 2A illustrates the front of an exemplary known ticket 200 printed in process colors in both its display portion 201 and variable indicia (not shown in FIG. 2A). In this example, two separate SOC areas 202 and 203 cover the winning or losing variable indicia of an un-played ticket concealing the variable indicia for both a primary game 202 as well as a bonus game 203. FIG. 2B illustrates 210 the same ticket 200 of FIG. 2A in a completely played condition (with its SOC completely removed). As shown in FIG. 2B, the ticket's display portion 211, primary game variable indicia 212, and bonus game variable indicia 213 are all printed as process colors utilizing the same common CMYK print heads.

Figure 2C:
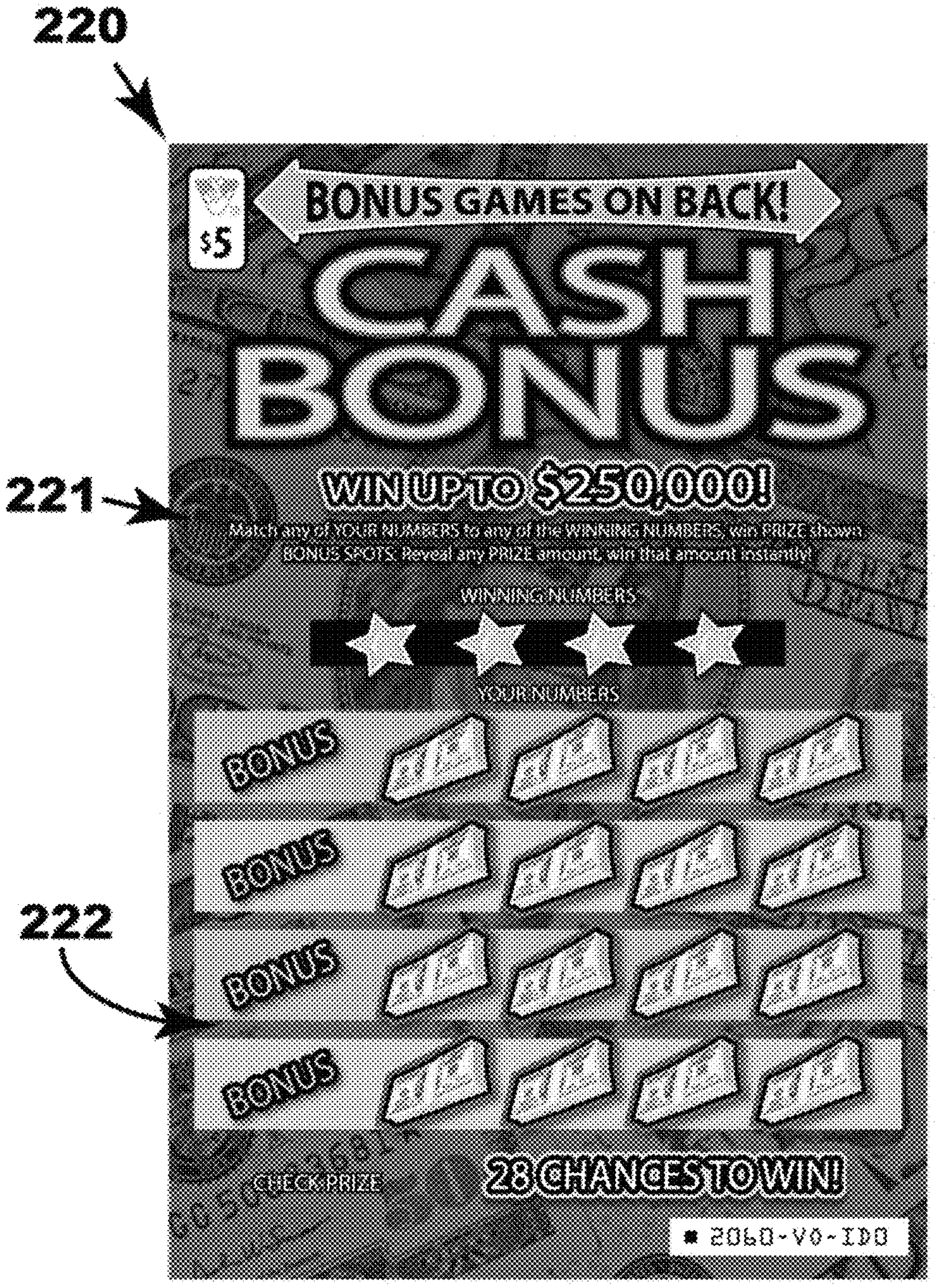
FIG. 2C PRIOR ART
FIG. 2C is a front view of a second known instant lottery ticket illustrating the front of the instant lottery ticket before the SOC is removed.
Figure 2D:
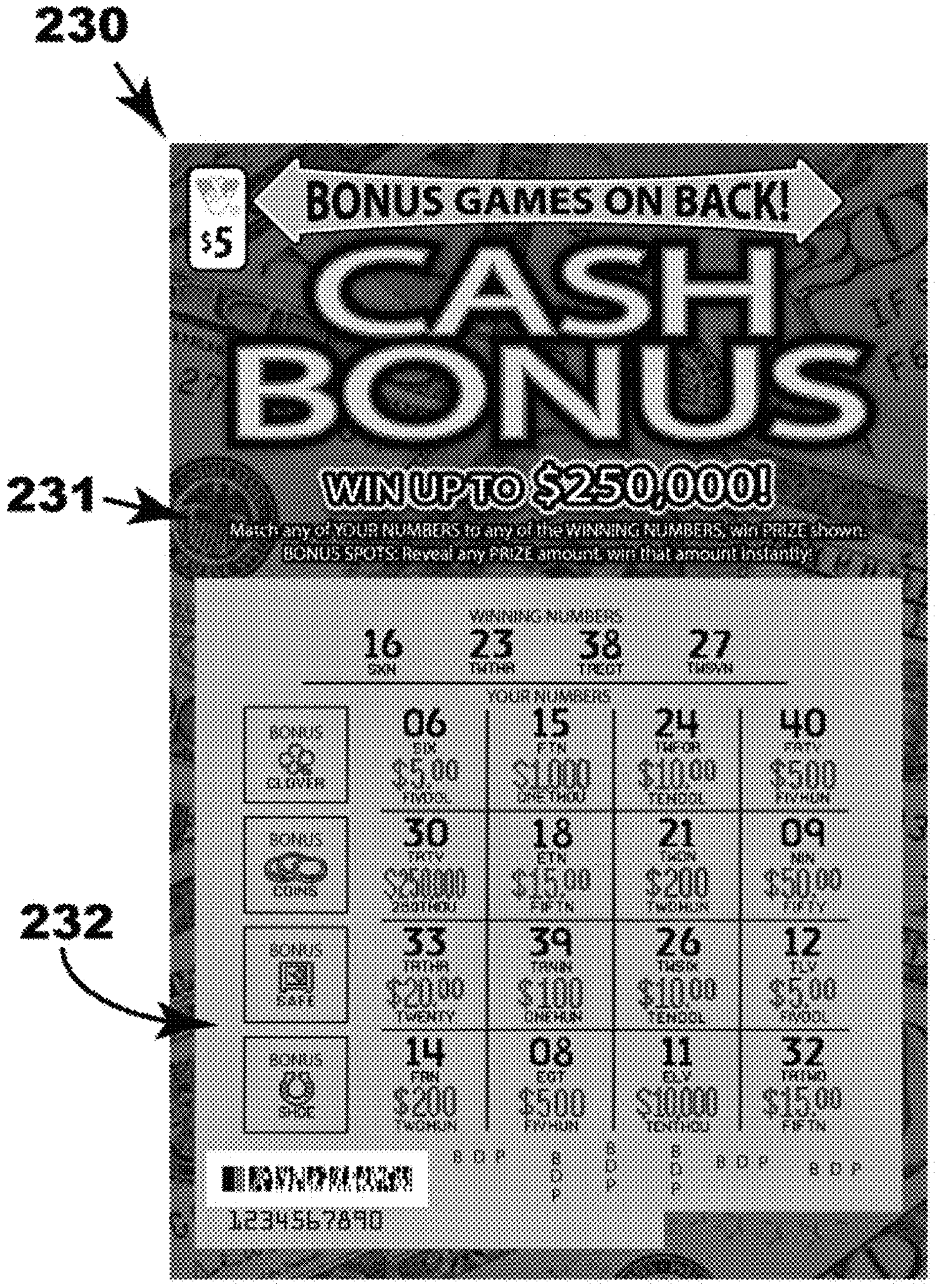
FIG. 2D PRIOR ART
FIG. 2D is a front view of the second known instant lottery ticket of FIG. 2C illustrating the front of the instant lottery ticket after the SOC is removed and thereby revealing the monochromatic variable indicia.
Figure 2E:
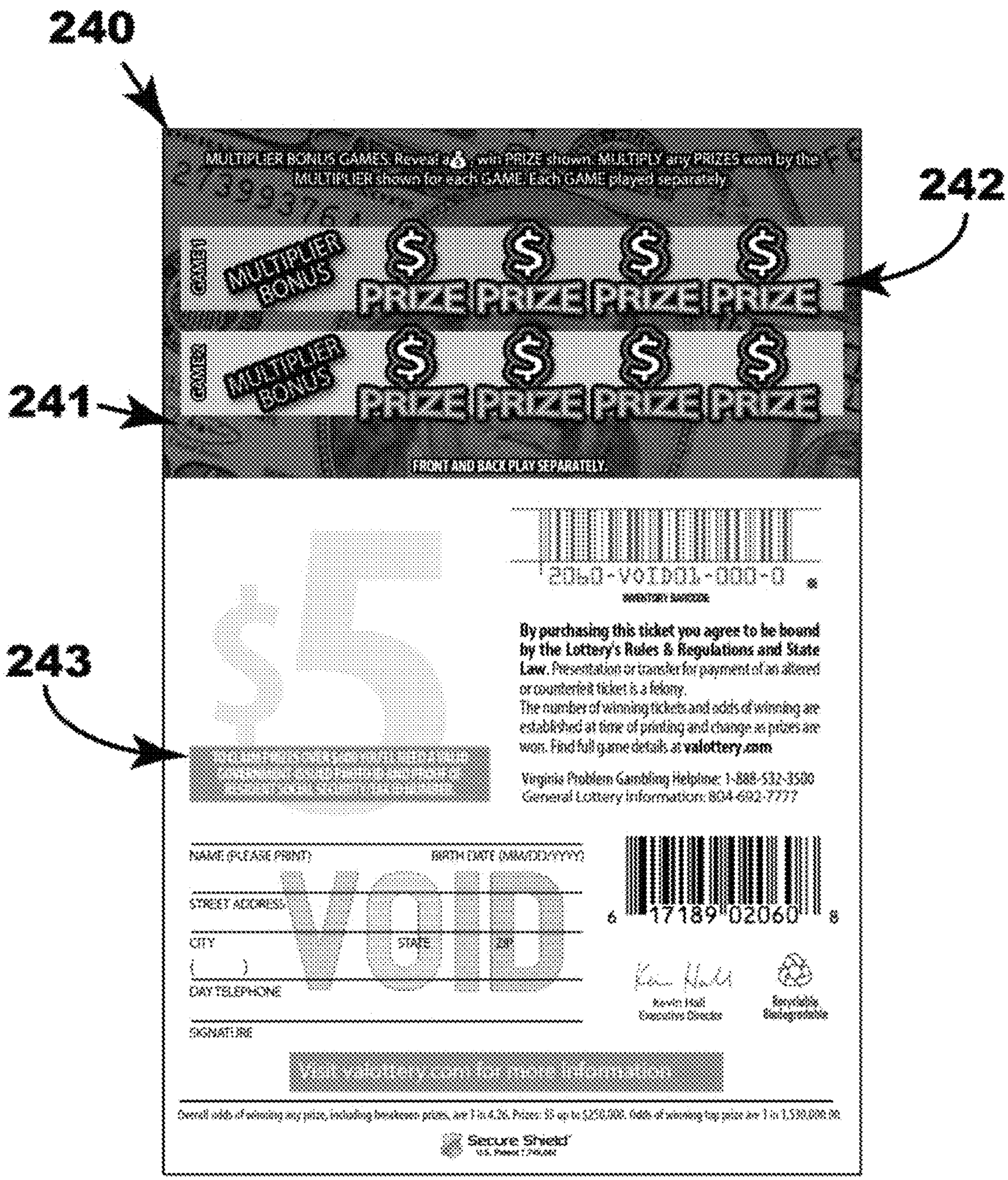
FIG. 2E PRIOR ART
FIG. 2E is a rear view of the second known instant lottery ticket of FIGS. 2C and 2D and illustrating the instant lottery ticket back before the back SOC is removed.
Figure 2F:
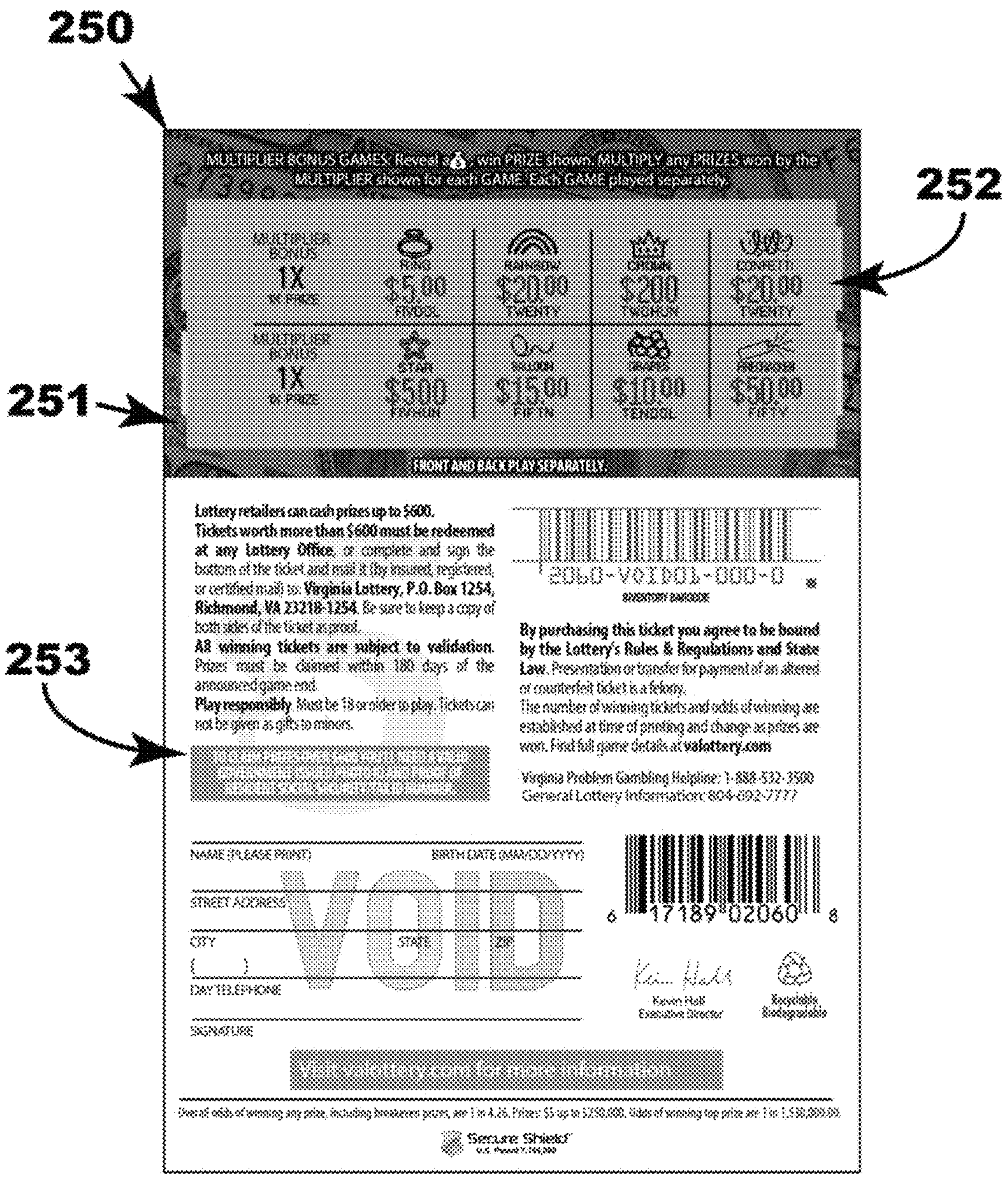
FIG. 2F PRIOR ART
FIG. 2F is a rear view of the back of the second known instant lottery ticket of FIGS. 2C, 2D, and 2E and illustrating the instant lottery ticket back after the back SOC is removed and thereby revealing the monochromatic variable indicia.

FIG. 2C illustrates the front of another exemplary known ticket 220 featuring monochromatic imaged variable indicia (not shown in FIG. 2C) covered by a decorative SOC 222 with its display background portion 221 printed with flexographic plates. The same ticket 230 is shown in FIG. 2D with the SOC completely removed thus revealing the monochromatic variable indicia 232 along with the display portion 231. The back 240 of the same ticket is illustrated in FIG. 2E with a second SOC 242 as well as a separate display background portion 241 surrounding the central area covered by the SOC 242. The ticket back 240 display background includes various legal information 243 typically found on the back of most instant tickets. FIG. 2F illustrates the back 250 of the same ticket of FIG. 2E with the SOC completely removed, revealing the monochromatic variable indicia 252 along with the same display background 251 and legal text portions 253.

Figure 2G:
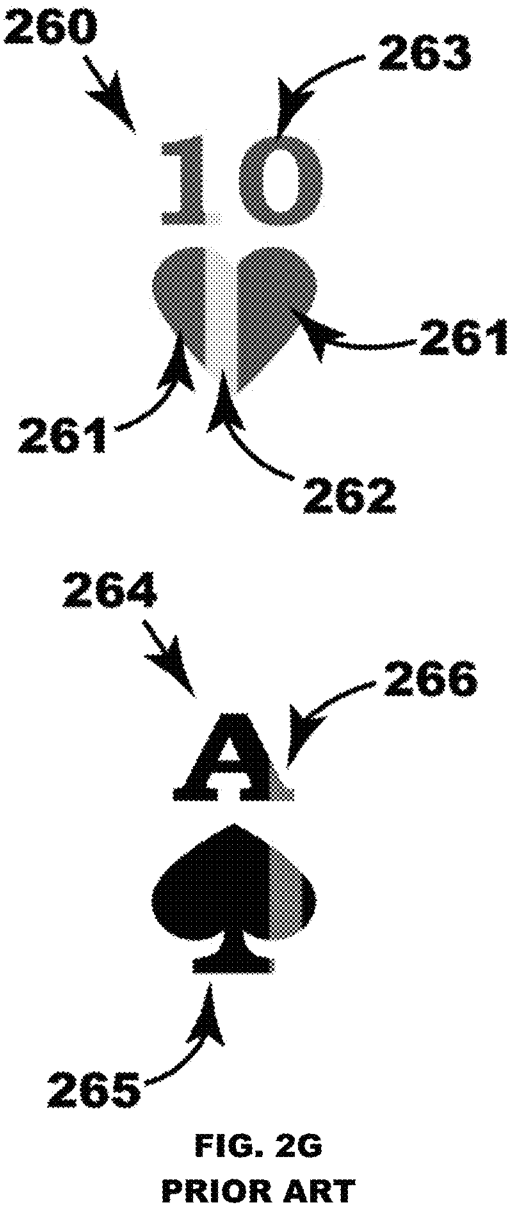
FIG. 2G PRIOR ART
FIG. 2G is a front view of two known front process color variable indicia exhibiting simulated printing failures.

FIG. 2G illustrates a known method of printing variable indicia with process colors to impart redundancy to the printing process thereby enhancing reliability. As shown in FIG. 2G, the "10 of Hearts" variable indicium 260 is printed as a process color comprised of magenta and yellow component colors. In this example, the "10 of Hearts" variable indicium 260 is partially shown in its intended 261 red process color as well with simulated misprints of the magenta 262 and yellow 263 printheads not imaging.

FIG. 2G illustrates an "Ace of Spades" variable indicum 264 including a "rich black" process color (i.e., 100% application of cyan, magenta, yellow, and black) partially illustrated as intended 265 as well with a simulated misprint 266 of the black printhead not imaging. For these two example process color variable indicia, printing redundancy is achieved by utilizing at least two different printheads and inks to image each variable indicium. For these two example process color variable indicia, the printing redundancy is only implemented at the variable indicium and does not extend beyond the variable indicum. Thus, while these proposed methods can be effective, the printing errors are under the SOC and therefore often not detectable before the lottery ticket is distributed and sold. In other words, the printing error does not extend beyond the external border of the actual variable indica.

Reference will now be made in detail to example embodiments of the present disclosure, with one or more embodiments illustrated in the drawings. Each example embodiment is provided by way of explanation of the present disclosure, and not meant as a limitation of the present disclosure. For example, features illustrated or described as part of one embodiment, may be used with another embodiment to yield still a further embodiment. The present disclosure encompasses these and other modifications and variations as come within the scope and spirit of the disclosure.

Various embodiments of the present disclosure relate to a printed security-enhanced document including a substrate, variable indicia printed on the substrate with at least one component color, and a display and/or base background printed with process colors such that the at least one component color comprising the variable indicia is also present in the document's process color display background. If there is a failure of the at least one common component color to print within the variable indicia, that failure will also be a failure of the same component color failing to print within the process color display and/or base background. In such a case, the printing failure is more detectable since the printing redundancy is both at the variable indicium and also extends beyond the variable indicum (and specifically beyond the external border of the actual variable indicum). In other words, since the printing error(s) are under the SOC and extend beyond the variable indicium and/or beyond the SOC, these printing errors are significantly more detectable before the lottery ticket is distributed and sold.

In various such embodiments, the document's variable indicia are printed with a plurality of component colors thereby creating process color variable indicia.

In various other such embodiments, the document's variable indicia are printed with a monochromatic color variable indicia.

In various embodiments, variable indicia printing defects are readily identified by printing at least some of the same component colors that comprise the variable indicia in at least a portion of the same document's display background process colors. In various embodiments, a display and/or base background includes at least some of the variable indicia's component colors is confined to the portion of the document that is covered by SOC when the document is in an un-played condition. In alternative embodiments, the display and/or base background includes at least some of the variable indicia's component colors and is printed over a substantial surface of the document.

In various embodiments, the at least one component color that comprises the variable indicia that are also present in the display and/or base background process color(s) is printed with a minimum saturation percentage to ensure that any printing defect of the at least one component color is readily identifiable in the display and/or base background. These embodiments thereby compensate for optical noise variances introduced by less-than-optimal underlying substrate discoloration, less-than-optimal lighting conditions, etc.

The present disclosure also relates to systems and methods for creating such printed security-enhanced document documents such as but not limited to instant lottery tickets.

It should be appreciated that in various such embodiments, the present disclosure relates to a lottery ticket with a printing error, wherein the lottery ticket includes a substrate, variable indica printed on a first area of the substrate, the variable indica having a printing error, and a display and/or base background printed on a second area of the substate, the display and/or base background have the same printing error. In various such embodiments, that lottery ticket can include a scratch off coating covering the variable indicia. In various such embodiments, the lottery ticket can include the scratch off coating also covering the display base background. In various such embodiments, the printing error of the base background is confined to a portion of the base background covered by the scratch off coating. In various other embodiments, the display background is not covered by any scratch off coating. In various such embodiments, the printing error of the variable indica and the printing error of the display and/or base background are a continuous printing error caused by a single printer. In various such embodiments, the variable indica includes a first component color and the display and/or base background comprises a plurality of component colors comprising the first component color, wherein the printing error of the variable indica comprises the absence of the first component color on the substate and the printing error of the display background comprises the absence of the first component color on the substate. In various such embodiments, the variable indica comprising a first plurality of component colors comprising a first component color and the display background comprises a second plurality of component colors comprising the first component color, wherein the printing error of the variable indica comprises the absence of the first component color on the substate and the printing error of the display background comprises the absence of the first component color on the substate. In various such embodiments, the first plurality of component colors and the second plurality of component colors comprise the same plurality of component colors. In various embodiments, the printing error is a process color print error.

It should be appreciated that in various other embodiments, the present disclosure relates to a lottery ticket without a printing error, wherein the lottery ticket includes a substrate, variable indica printed on a first area of the substrate, the variable indica comprising a first component color printed by a first printer, and a display background printed on a second area of the substate, the display background comprising a plurality of different component colors comprising the first component color printed by the first printer. In various such embodiments, the lottery ticket can include a scratch off coating covering the variable indicia. In various such embodiments, the lottery ticket can include the scratch off coating covering the display background. In various such embodiments, the display background is not covered by any scratch off coating. In various such embodiments, the lottery ticket can include the scratch off coating covering part of the display background and part of the display background not covered by any scratch off coating. In various such embodiments, the first component color printed by the first printer is aligned with the first component color of the display background. In various such embodiments, the variable indica comprising a first plurality of component colors with one comprising the first component color. In various such embodiments, the first plurality of component colors and the second plurality of component colors comprise the same plurality of component colors. In various such embodiments, the component colors are process color components.

It should be appreciated that in various other embodiments, the present disclosure relates to a lottery ticket without a printing error, wherein the lottery ticket includes: a substrate; variable indica printed on a first area of the substrate, the variable indica comprising a first plurality of different component colors comprising a first component color printed by a first printer; a scratch off coating covering the variable indicia; and a display background printed on a second area of the substate, the display background comprising a plurality of different component colors comprising the first component color printed by the first printer, wherein the display background is not covered by any scratch off coating, wherein the first component color printed by the first printer is aligned with the first component color of the display background. In various such embodiments, the first plurality of component colors and the second plurality of component colors comprise the same plurality of component colors. In various such embodiments, the component colors are process color components.

Other objects and advantages of the present disclosure will be set forth in part in the following description, or may be apparent from the present description, or may be learned through practice of the present disclosure. Described below are a number of variable indicia printing defect determination processes, printing mechanisms, and methodologies that provide practical details for reliably determining variable indicia printing errors. Although the examples provided herein are primarily related to instant lottery tickets, it should be appreciated that the same methods are applicable to any other type of document (such as but not limited to a telephone card, prepaid cards, vouchers, bank security instruments, coupons, etc.) such as where information is protected by a SOC.

Various embodiments of the present disclosure enable printing indicia defects to be detected by employing at least one variable indicia component color in a process color display and/or base background. Thus, so long as variable indicia component colors are also printed in at least a portion of the process color display and/or base background, process color indicia printing defects are readily identified (preferably even after the SOC is applied), and consequently the production variable indicia non-defect rate can be substantially increased to a percentage beyond the Six Sigma (6σ) reliability standard explained above.

The present disclosure teaches how a document such as an instant lottery ticket can be configured such that printing defects occurring in the variable indicia are replicated and can be magnified in one or more portions of the display and/or base background of the document (that are outside of the external border of the variable indicia).

Figure 3A:
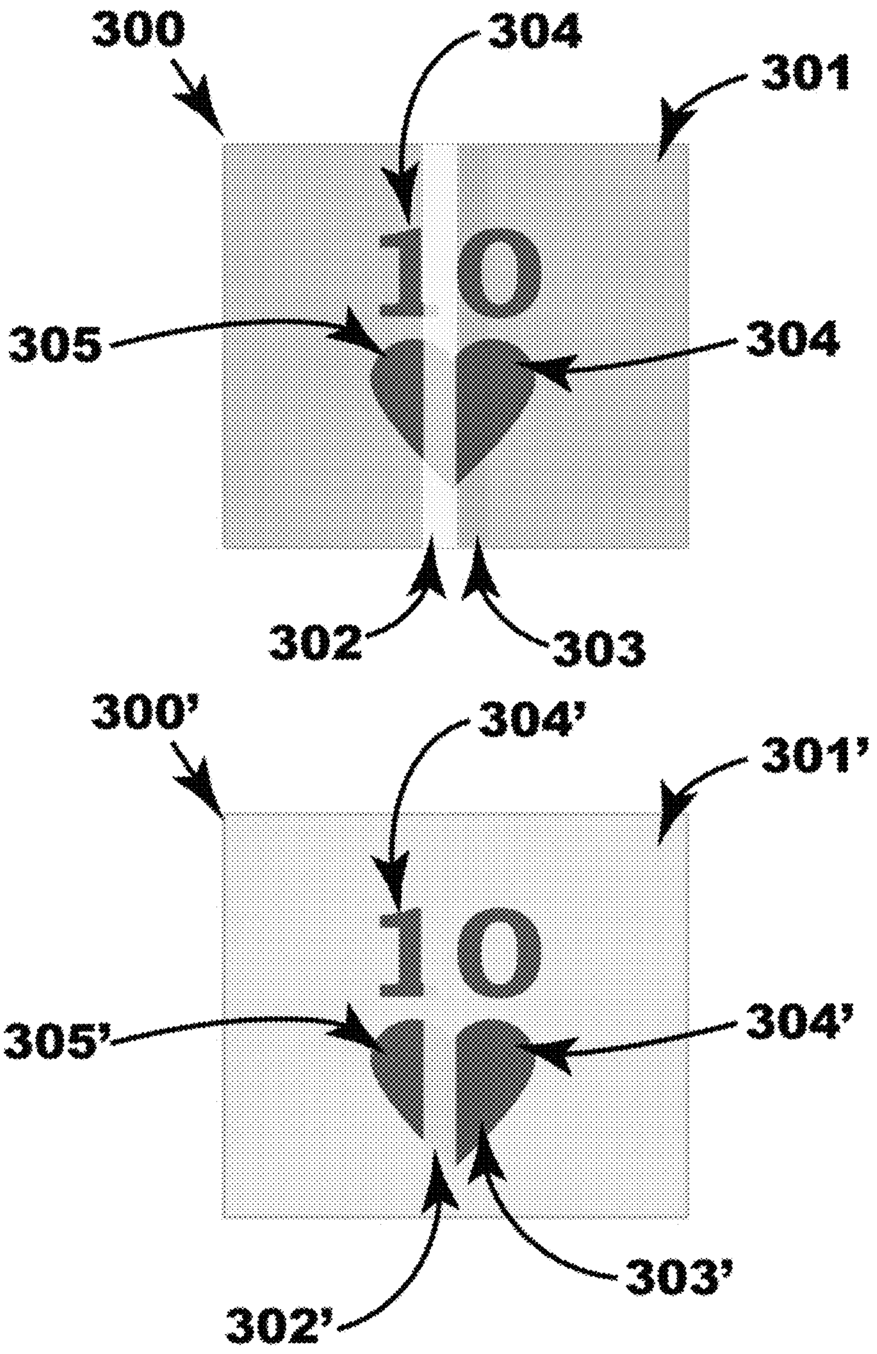
FIG. 3A are two front views of a first representative example of part of an instant lottery ticket of one example embodiment of the present disclosure, and showing process color variable indicia with and without the indicia's component colors in the associated background of the instant lottery ticket.

For example, FIG. 3A depicts a representative example of modified instant lottery ticket indicium and associated display background 300 comprised of multiple (e.g., two—yellow and magenta) component color ink applications producing a process color indicium and associated base background. While, in this example, both the indicium and associated base background include the same two component colors, the necessary contrast to identify the variable indicum from its base background is achieved by printing the variable indicum with different saturation percentages than the associated base background. For example, the magenta and yellow component colors of the indicum are both printed at 100% ink saturation with both the magenta and yellow component colors of the associated base background printed at 30% saturation. The printing convention of percentages (such as a scale of 0% to 100%) displayed in FIG. 3A conveys how much ink is applied for a given component color with a value of 0% denoting white (such as no ink applied, white paper) and a value of 100% denoting total ink saturation.

The example document 300 in FIG. 3A illustrates how the present disclosure amplifies and enables identification of misprints in the variable indicia by printing the same component colors in the indicum 305 and associated display background 301.

FIG. 3A illustrates a correctly printed portion 304 illustrating how the indicium 305 and base background 301 would appear (red) with no misprints.

FIG. 3A illustrates a simulated failure of the magenta printhead to image resulting in a yellow streak line 302 through both the indicium 305 and the associated base background 301. This streak line 302 is aligned along both the indicium 305 and the associated base background 301 and extends outside of the external borders of the indicium 305.

FIG. 3A illustrates a simulated failure of the yellow printhead to image resulting in a magenta streak line 303 through both the indicium 305 and the associated base background 301. This streak line 303 is aligned along both the indicium 305 and the associated base background 301 and extends outside of the external borders of the indicium 305.

FIG. 3A thus illustrates that by including the same indicum 305 component colors in the process color associated display background 301, any printhead misprint in the variable indicia 305 will be replicated and amplified in the associated base background 301. The extent that the associated base background 301 amplifies any variable indicia 305 misprint can vary in accordance with the present disclosure, and is in part related to the size of the portion of the associated base background 301 relative to the entire document's surface in which the associated display background 301 is printed with the same component color printheads and inks as the variable indicia 305.

The second representative example document 300' of FIG. 3A illustrates the same indicium as with document 300 with the same simulated misprints; however, in representative example document 300', the associated display background 301' is composed of 30% black and therefore does not include any of the component colors of indicium 305'. Consequently, the identical indicum example embodiments of correctly printed indicum 304', magenta printhead failure to image 302', and yellow printhead failure to image 303' misprints of 300 are confined only to the indicum 305' itself in the example of 300'. This isolation of misprints to the variable indicia 305' makes it much more difficult to detect when printing production documents or tickets in high volumes especially when it is realized that, as its name implies, the "variable" indicia will vary from ticket-to-ticket.

Example embodiments of the present disclosure are now described in relation to specific example instant lottery tickets.

Figure 3B:
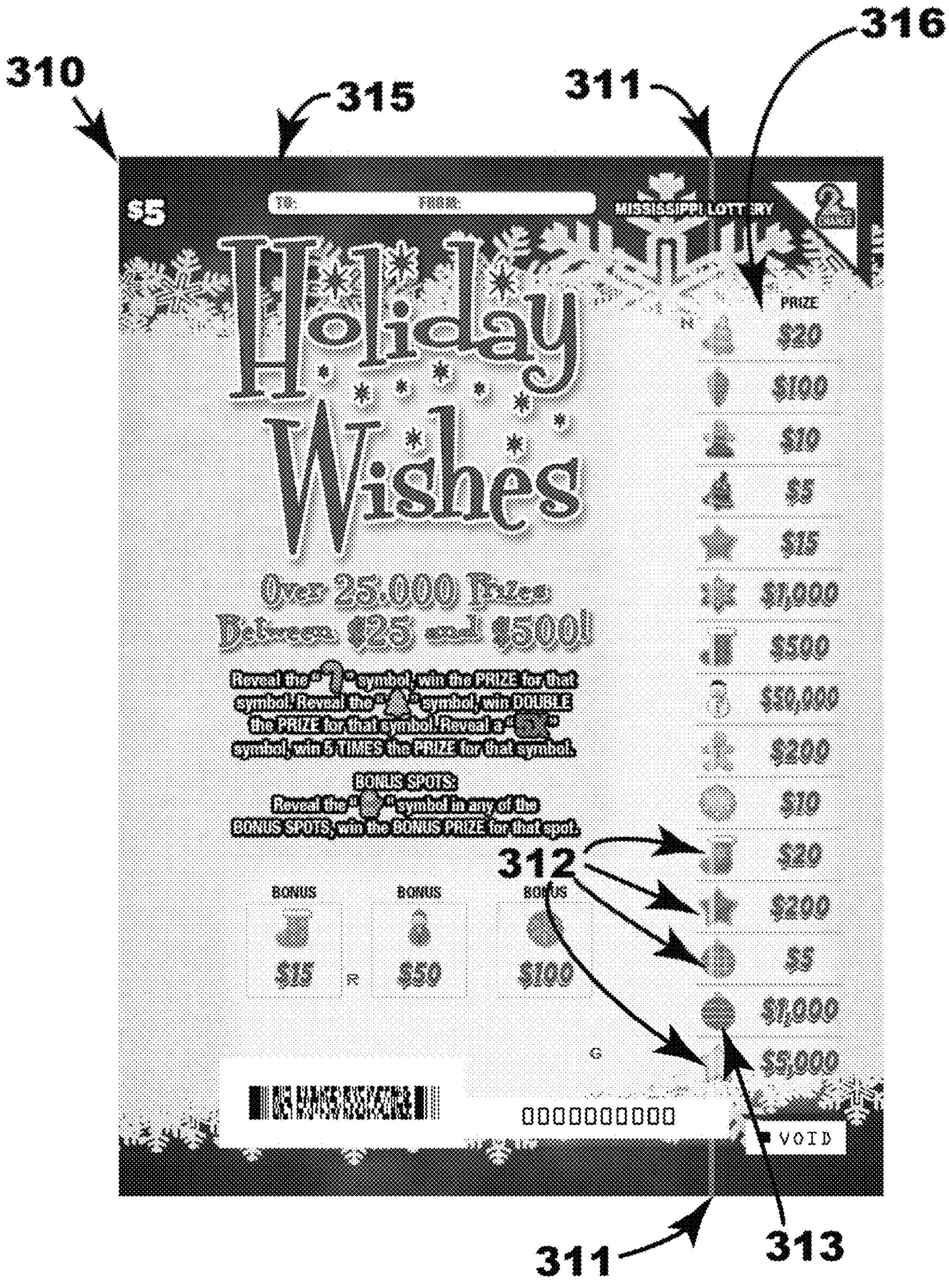

A first example ticket 310 is shown in FIGS. 3B, 3B1, and 3B2. As illustrated, lottery ticket 310 is shown in three different views: the entire ticket 310 with all of the SOC removed in FIG. 3B, a magnified view 310' of a portion of interest of lottery ticket 310 also with all of the SOC removed in FIG. 3B1, and the entire ticket 310" with the SOC 314 not removed in FIG. 3B2.

The ticket 310 of FIG. 3B includes a column of variable indicia 316 and an associated display background 315. In this example, a magenta printhead failure is simulated resulting in the misprint line or column 311. Since the simulated magenta printhead failure occurs within the vertical column of variable indicia 316 potentially all variable indicia in this column can be impacted by this misprint. As shown in the magnified view 310', each variable indicum printed with a magenta component color 312 exhibit a portion of misprint line or column 311 with indicia printed without a magenta component color 313 not exhibiting any misprint.

Since the top and bottom portions of the ticket's display background 315 are printed with varying red colors, the same magenta printhead failure is also apparent with misprint line 311 extending through the top and bottom portions of the ticket's display background 315. As shown with the entire ticket 310" with the SOC 314 not removed, even with the SOC 314 in place on an unsold or un-played ticket 310", the magenta printhead failure is readily apparent due to the misprint line 311 extending into the display background area 315 not covered by SOC 314. Thus, in this example embodiment of the present disclosure, the variable indicia magenta printhead failure misprint 311 is replicated and amplified in the associated display background 315 and can be inferred when the SOC is intact. This enables a ticket manufacturer to scan such tickets manually and/or automatically to detect printing defects in the visible display backgrounds that indicate that printing errors in the variable indicia under the SOC, and thus a defectively printed ticket. In other words, as previously stated "variable indicia" varies from ticket-to-ticket and consequently printing defects occurring in just the variable indicia are very difficult for both humans and automated quality assurance (QA) systems to detect; however, the present disclosure contemplates that if the same printing defect can be replicated and/or amplified to a portion of the ticket beyond the variable indicia, it becomes much more evident to both humans and machines that a printing error has occurred.

Figure 3C:
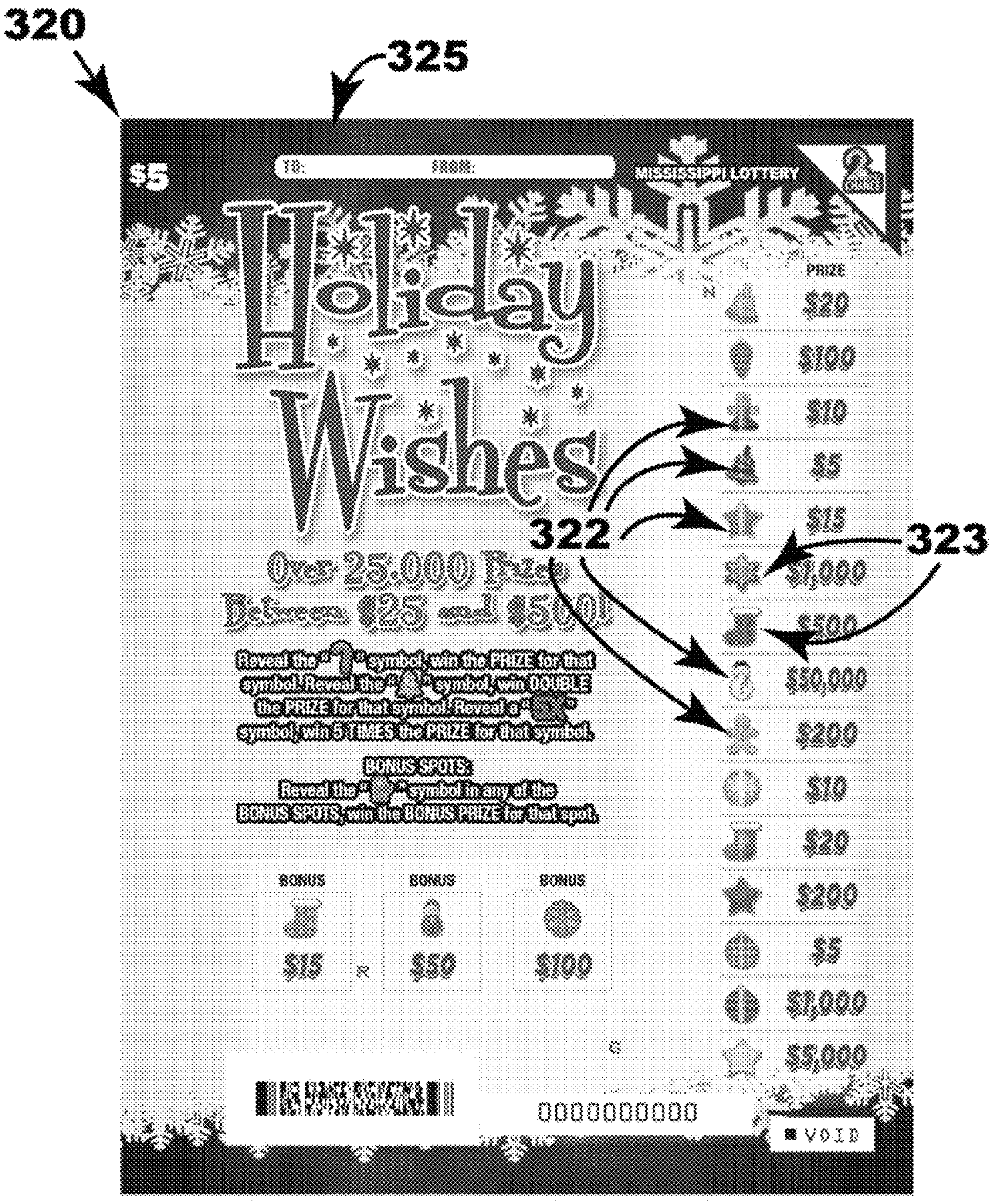

FIGS. 3C, 3C1, and 3C2 illustrate a similar ticket 320 as the ticket of FIGS. 3B, 3B1, and 3B2, but in this example, a cyan printhead failure is simulated instead of a magenta printhead failure. Since there is no cyan component color in the display background 325 of the ticket 320, the cyan misprint is confined to the process color variable indicia that include cyan as a component color 322. As shown in the magnified view 320' in FIG. 3C1, the cyan misprint is evident with some indicia 322, but not apparent with the process color indicia that do not incorporate cyan as a component color 323. Consequently, since the display background 325 incorporates no cyan component color in the area where the misprint occurred, there is no indication that the ticket 320" is defective with its SOC 324 intact and not removed.

Figure 3D:
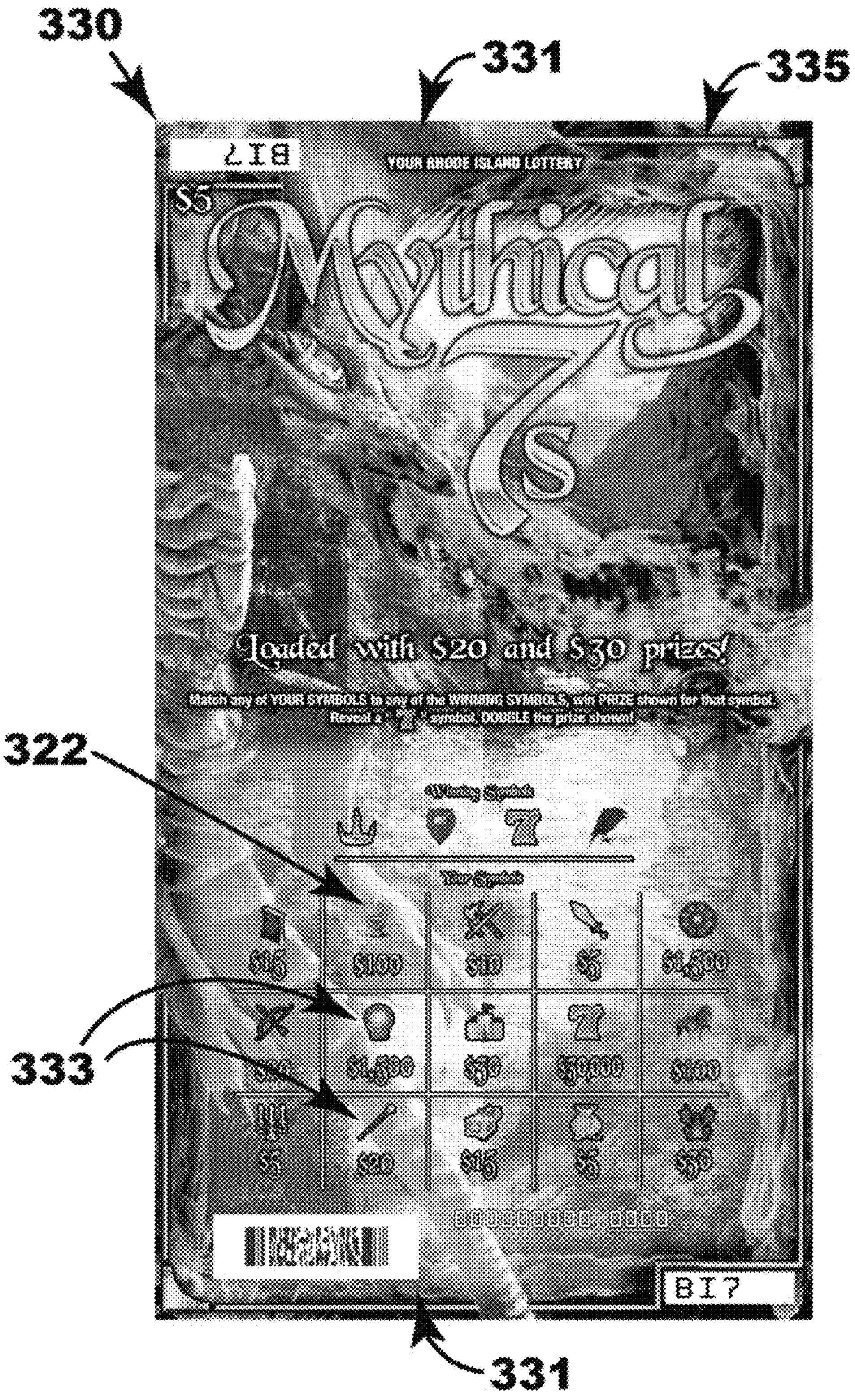

FIGS. 3D and 3D1 illustrate another different misprint example for ticket 330 (and ticket 330' with the SOC intact) that has a more complex ticket art configuration where both the variable indicia and the display 335 and base backgrounds are printed with process colors from the same CMYK printheads. FIGS. 3D and 3D1 show a simulated failure of the cyan printhead 331 that is: (a) readily apparent in the display background 335; (b) only somewhat apparent in the process color variable indicia that include cyan as a component color 322; and (c) not apparent at all in the variable indicia that do not incorporate cyan as a component color 333. When the SOC 334 of the ticket 330' is intact as shown in FIG. 3D1, the cyan printhead misprint 331 is readily apparent in the display background 335 not covered by the SOC 334.

Figure 3E:
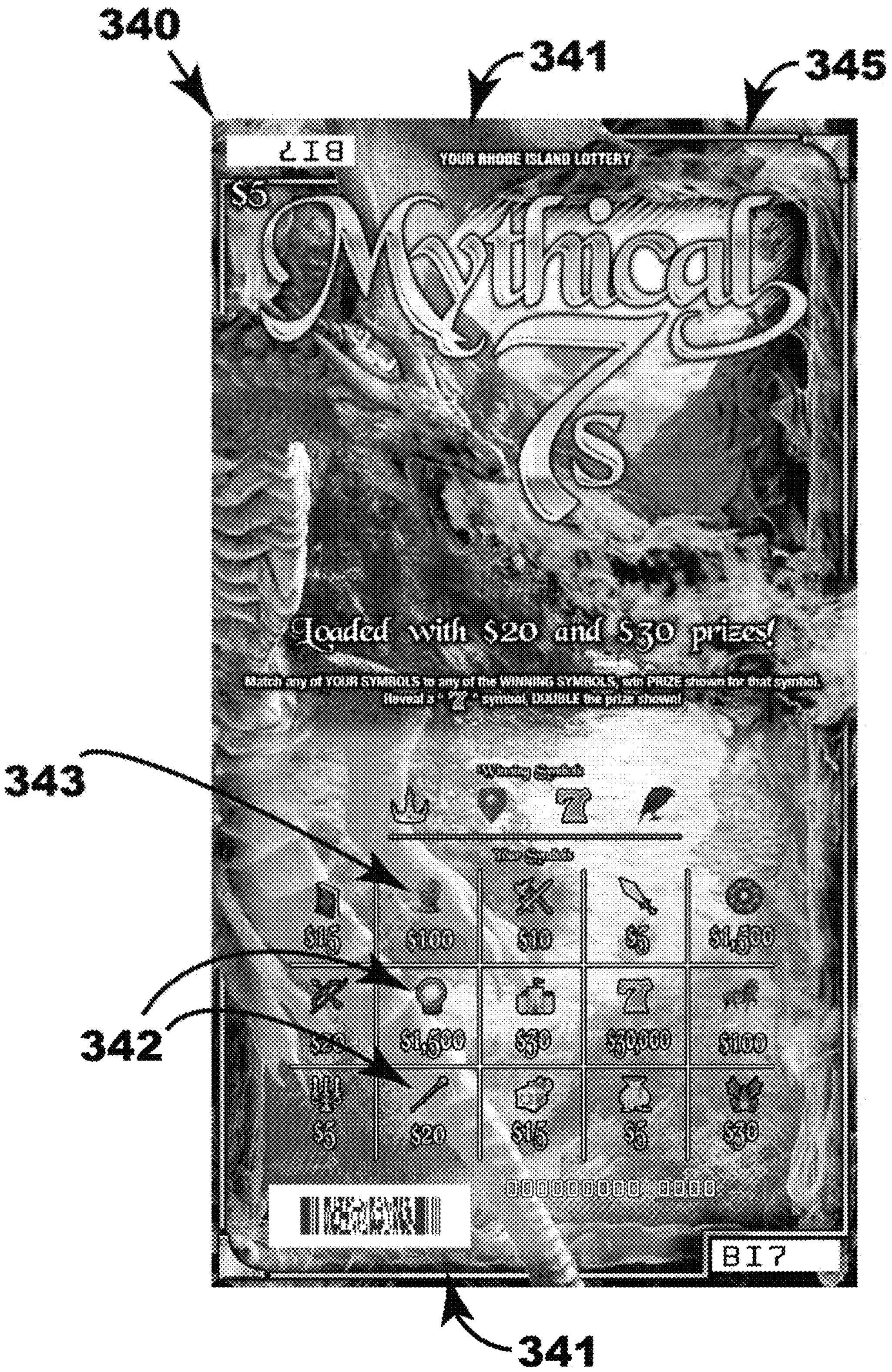

FIGS. 3E, and 3E1 illustrate another different misprint example for ticket 340 (340' with the SOC intact) that also has a more complex ticket art configuration where both the variable indicia and the display 345 and base backgrounds are printed with process colors from the same CMYK printheads. In FIG. 3E, a simulated failure of the yellow printhead 341 is: (a) apparent in the display background 345; (b) only somewhat apparent in the process color variable indicia that include yellow as a component color 342; and (c) not apparent at all in the variable indicia that do not incorporate yellow as a component color 343. As before, when the SOC 344 is intact as shown for ticket 340', the yellow printhead misprint 341 is readily apparent in the display background 345 not covered by the SOC 344.

In FIG. 3E, the simulated yellow misprint 341 affecting the process color indicia incorporating yellow as a component color 342 is barely noticeable when compared to FIG. 3D. This is because in the FIG. 3E example ticket 340 the simulated yellow misprint 341 impacted process color indicia 342 are complex artwork with only a small percentage of yellow utilized as a component color. However, the simulated yellow misprint 341 is readily apparent in the display background 345 of the ticket 340 because in the display background 345 art the yellow component color is a higher percentage saturation than in the associated variable indicia. This example includes between 68% to 100% yellow ink saturation for the display background art and between 0.5% to 8% yellow ink saturation for the variable indicia art. Thus, the present disclosure contemplates that under some circumstances, it may be desirable to ensure the display background art maintains, at least in some areas, a minimum saturation percentage to ensure that any component color misprints are readily identifiable outside of the area covered by the SOC. While this minimum percentage saturation can vary depending on external factors (e.g., less-than-optimal ambient lighting conditions) and ticket configuration and construction (e.g., less-than-optimal underlying substrate discoloration, complex artwork design) as well as the nature of the component color itself, in certain embodiments a goal is to ensure that the display and/or base background artwork prints each component color that is present in the variable indicia with at least 5% saturation in one or more areas.

Figure 3F:
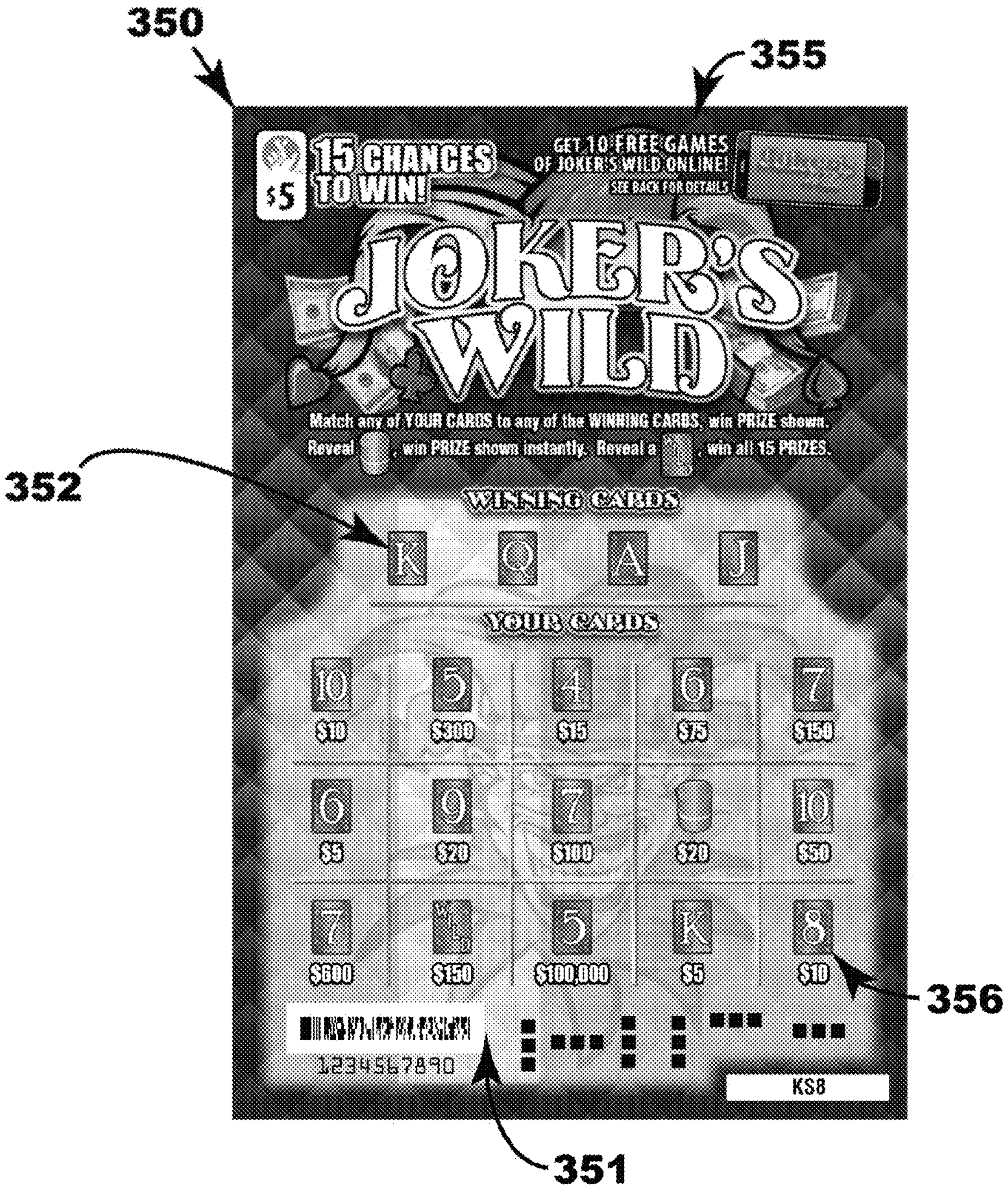

FIGS. 3F and 3F1 illustrate an example embodiment of a hybrid lottery ticket 350 and (350' with the SOC) where only the portion of the base background 356 that is covered by SOC 354 on the ticket 350 is printed as process colors utilizing the same component color printheads as the variable indicia. In this embodiment, the portion of the background display 355 that is not covered by SOC 354 is printed with a static plate (e.g., flexographic) printing process. As shown in FIG. 3F, a simulated failure of the magenta printhead to image results in the misprint line or column 351 in the base background area 356 somewhat similar to the previous examples. However, since the display background 355 not covered by SOC 354 is printed with a different printing process, the magenta in the visible display background 355 provides no indication of a printed defect in the area covered by SOC 354 on the ticket 350'. Thus, even though the magenta misprint is readily identifiable in the base background 356 normally covered by SOC as well as the variable indicia that incorporate magenta as one of its component colors 352, the underlying misprint is not apparent in the display background portion 355 visible on ticket 350 after the SOC is applied.

With the example embodiment of FIGS. 3F and 3F1 where the amplification of any misprint in the variable indicia 352 is confined to the base background 356 which is covered by SOC by the end of the printing process, any automated QA system (e.g., QA camera system that detects printing defects 351 that can occur in the base background 356) can be positioned on the printing press in an area to be able to take images of the variable indicia and base background 356 before the indicia and base background 356 are covered by SOC. This embodiment thus has the advantage of less process color ink consumption thereby providing economy since process color ink component colors can be substantially more expensive than plate printed colors, with the disadvantage of printing defect being less apparent or amplified after the SOC is applied.

Figure 3G:
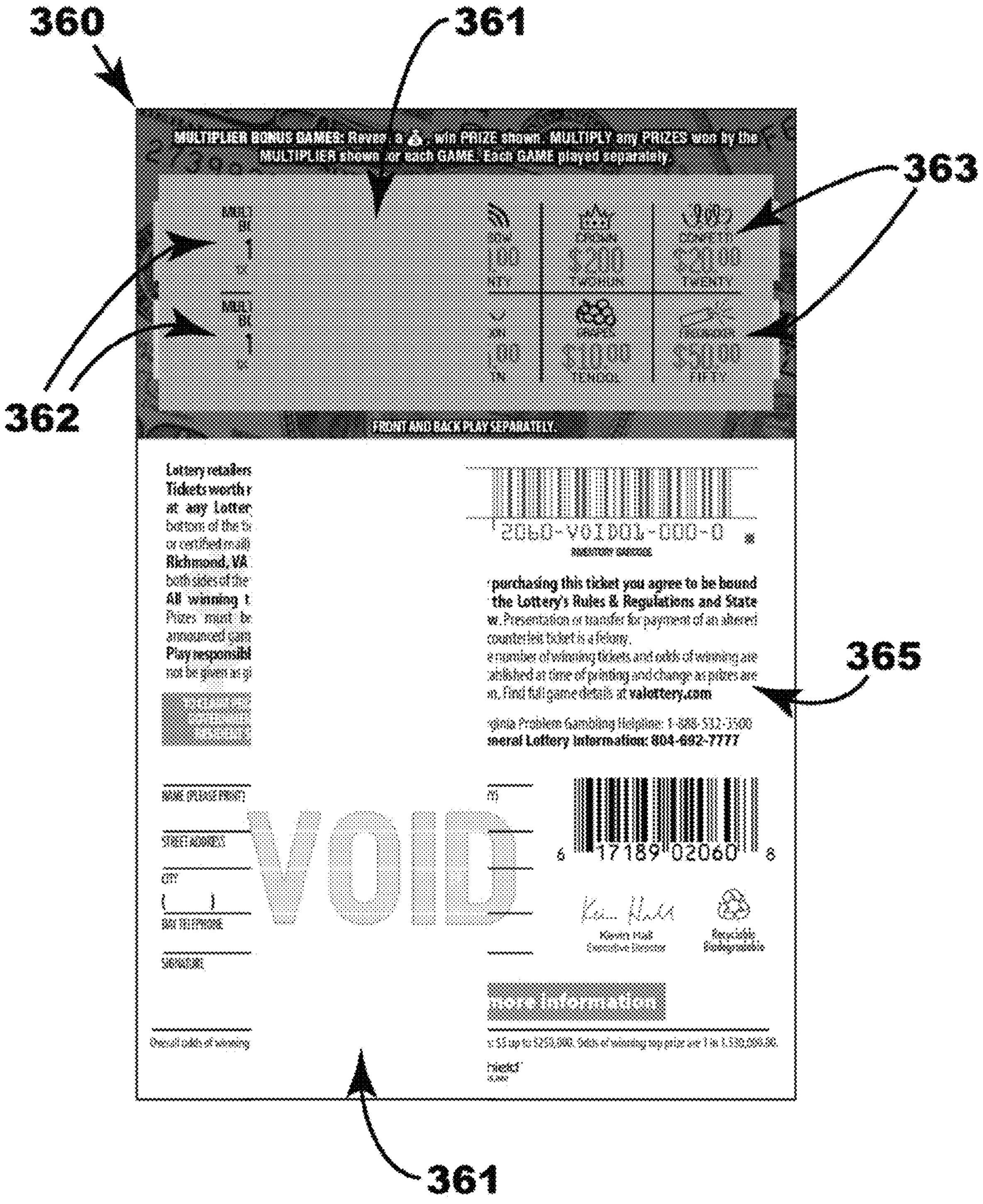

It should be appreciated that the present disclosure is not limited to process color indicia and associated display backgrounds. For example, FIGS. 3G and 3G1 illustrate a back of a ticket 360 with monochromatic black ink printed variable indicia 363 where the legal text portion 365 printed in the display background of the same ticket is also printed with the same monochromatic black ink and imager printhead. As shown in the ticket 360' with the SOC intact, the monochromatic black ink printed legal text 365 is readily visible in the display background outside of the SOC 364 when the SOC 364 is intact. Thus, printing of both the variable indicia 363 and the legal text 365 with the same monochromatic black imager printhead enables misprints 361 of the variable indicia 361 and 362 to be readily identifiable and amplified in the legal text 365 of the display background similar to previous example embodiments.

Figure 4:
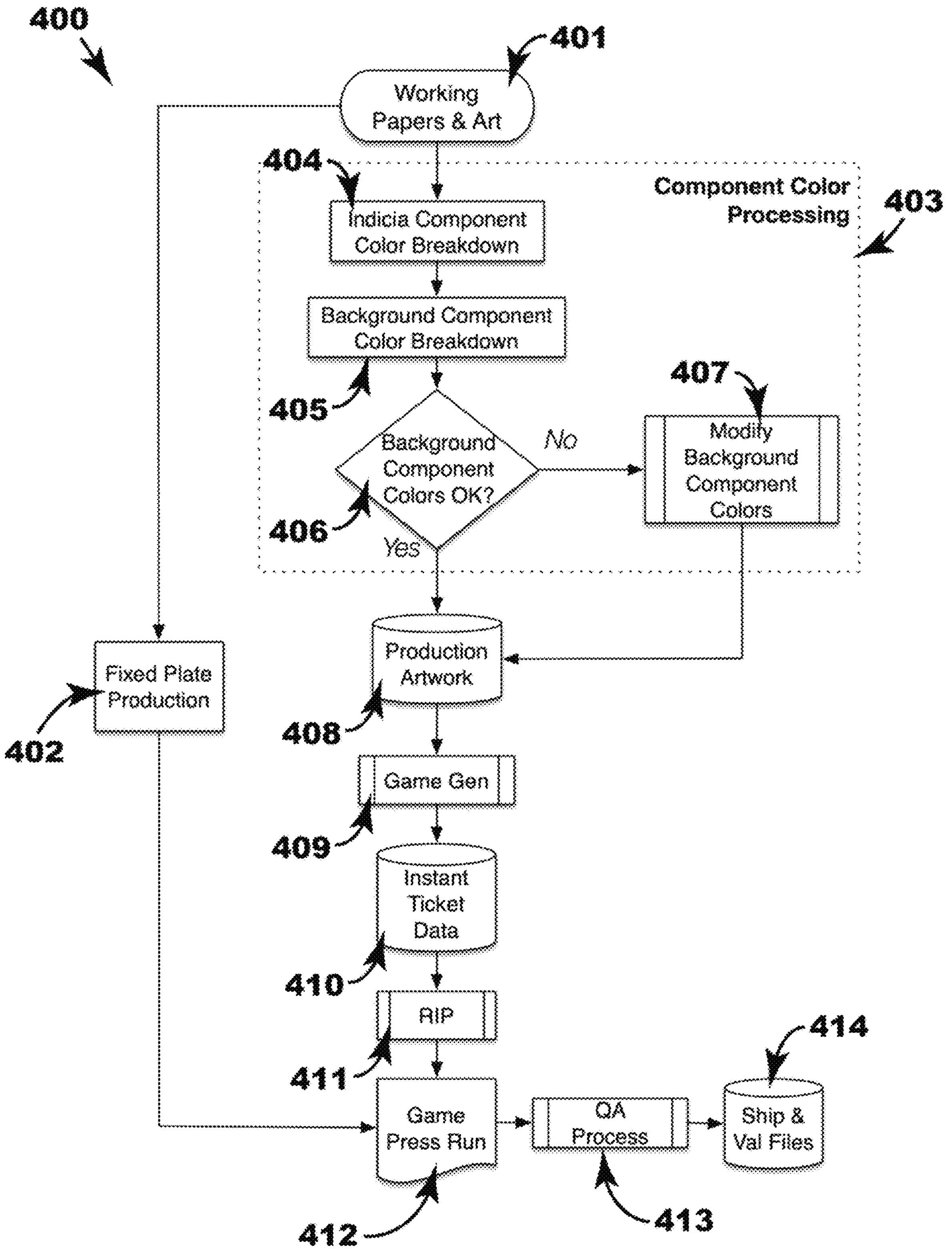
FIG. 4 is a flowchart showing a schematic graphical overview of one example embodiment of the present disclosure for ensuring that portions of an instant lottery ticket other than the variable indicia can exhibit a similar failure if a variable indicia component color fails to print.

FIG. 4 illustrates an example method 400 of making the representative example instant lottery tickets of FIGS. 3A thru 3G1, wherein at least a portion of display and/or base background of each ticket reveals and amplifies misprints that occur in the variable indicia of that ticket. As shown in FIG. 4, the indicia misprint identification and amplification in the display and/or base background area starts with the generation of working papers as indicated by 401. For example, the working papers can include a contract between the lottery and instant ticket provider describing the technical details of the tickets to be printed and the variable indicia and display and base background artwork for the tickets. The artwork from the working papers can be then used to specify Component Color Processing as indicated by 403 (such as the digital indicia imaging of the variable indicia and at least portions of the display background) as well as the manufacture of any static printing plates (e.g., flexographic, Gravure) as indicated by 402 that will be used to print the security ink film layers of the tickets and optionally portions of the display backgrounds of the tickets.

In this example embodiment, the Component Color Processing begins with an analysis of the variable indicia artwork as indicated by block 404 that includes determining the component colors that will comprise the spot or process color indicia. Once the component colors of the variable indicia artwork have been determined, this method includes a separate analysis of the display and/or base background artwork as indicated by 405 to determine its component colors and optionally to determine the level of color saturation intended for each of its component colors over what portion of the display and/or base background. When both analyses are complete, a process is initiated to determine if the display and/or base background art (as is) will provide a sufficient replication and possible amplification of any misprints that can occur in the variable indicia, as indicated by 406. If the outcome is “Yes”, then the variable indicia and display and/or base background artwork are configured and saved for press imaging as indicated by 408. However, if the outcome is “No”, then the display and/or base background (or optionally indicia) is/are modified as indicated by 407 to ensure that any misprints that can theoretically occur in the variable indicia are replicated and amplified in the display and/or base background. Once these modifications are complete, the modified variable indicia and display and/or base background artwork are configured and saved for press imaging as indicated by 408.

Next, in this example, the configured Production Artwork is submitted to a Game Gen (Generation) algorithm as indicated by 409 that essentially arranges the variable indicia into winning and losing patterns over the base background for printing, creating an Instant Ticket Data imaging file indicated by 410 for an entire game. During the printing process, the Instant Ticket Data imaging file indicated by 410 is submitted to a Raster Image Processor (RIP) indicated by 411 for conversion into raster data that drives the imager printheads during the Game Press Run indicated by 412. The Game Press Run indicated by 412 creates both physical printed tickets as well as the associated Ship and Validation files indicated by 414 that enable automatic validation of purchased winning lottery tickets. Optionally, a QA press monitoring system indicated by 413 (e.g., QA camera system that detects printing defects that can occur in the display and/or base background) can be implemented on the printing press to monitor the relatively static display and/or base background images for printing defects. In various embodiments, QA press monitoring 413 can be employed for the static display and/or base backgrounds rather than the variable indicia because, as its name implies, variable indicia by design varies from ticket-to-ticket and consequently presents a much more complex monitoring problem for any automated QA system 413. With the embodiments of the display background being comprised of component colors of the variable indicia, the QA monitoring system 413 can be placed near the end of the press after the SOC has been printed. For the specific embodiment of only the base background being comprised of component colors from the variable indicia, the QA monitoring system 413 can be positioned after the variable indicia and base background have been printed, but before the SOC is printed.

Figure 5A:
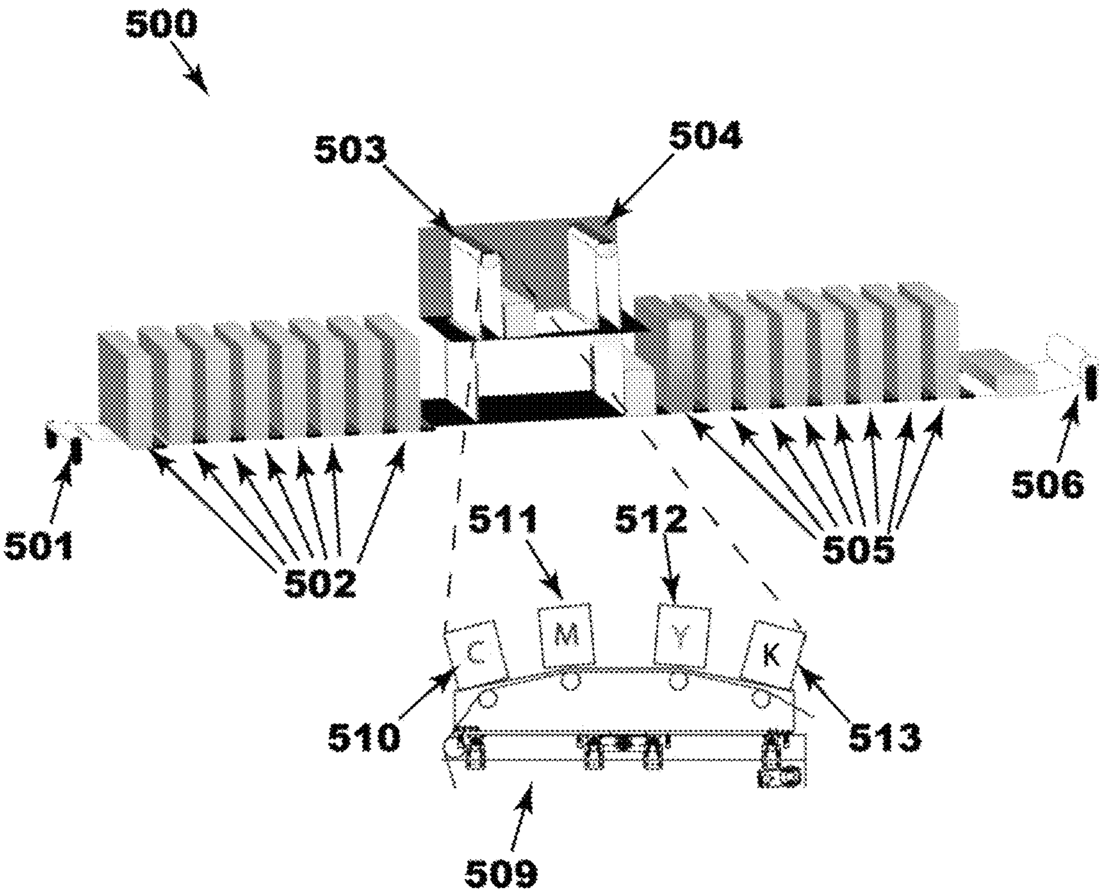
FIG. 5A is a schematic front perspective view of an exemplary embodiment of an inline digital imager capable of printing the exemplary instant lottery ticket variable indicia and the display and base backgrounds of the example tickets of FIGS. 3B thru 3G2.
Figure 5B:
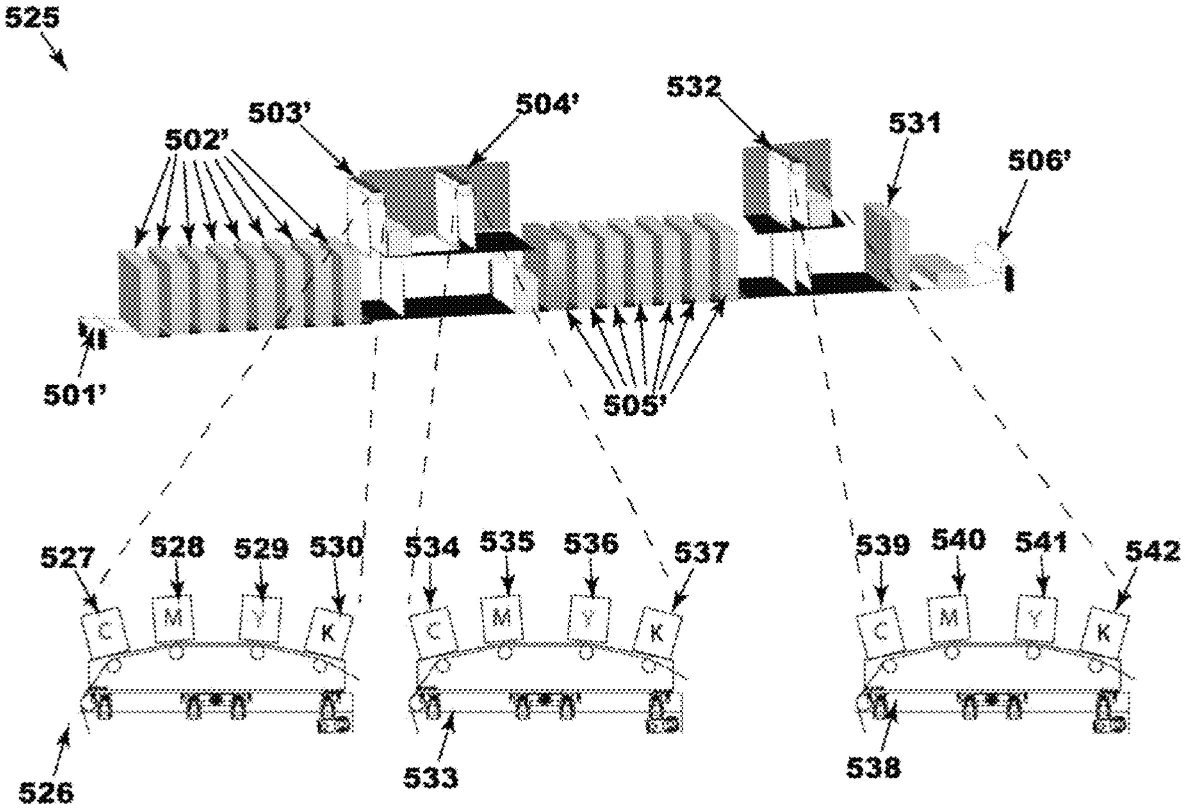
FIG. 5B is an alternative schematic front perspective view of an exemplary embodiment of an inline digital imager capable of printing the exemplary instant lottery ticket variable indicia and the display and base backgrounds of the example tickets of FIGS. 3B thru 3G2.

One exemplary configuration for a press 500 capable of producing the ticket or other documents of example embodiments of FIGS. 3A thru 3G1, is illustrated in FIG. 5A. The FIG. 5A press 500 optionally features at least one set of process color digital imagers—e.g., one for the front display and game play variable indicia 503 (shown magnified as callout 509). FIG. 5B illustrates an alternative configuration for a press 525 including three sets of process color digital imagers, one for the game play variable indicia 503' and optionally for the front display and/or base backgrounds (shown magnified as callout 526), one for the back of the ticket 504' (shown magnified as callout 533), and a third process color digital imager 532 (shown magnified as callout 538) for the Overprint or “OP.”

As shown in FIG. 5A, the press 500 includes a modified hybrid flexographic and digital imager printing press used to produce variable indicia SOC secured tickets or other documents. The press 500 unravels its paper web substrate from a roll 501 and flexographically prints 502 lower security layers in the scratch-off area as well as an optional primer. At this point, the press web enters a secured imager room where the front game play variable indicia are applied by imager 503. However, as disclosed herein with magnified view 509, the front game play variable indicia and display and/or base backgrounds may be optionally digitally imaged as process colors with the separate Cyan 510, Magenta 511, Yellow 512, and blacK 513 print heads synchronized together to produce the process color (“CMYK”) display and/or base backgrounds and the game play variable indicia image on the front of the ticket. Imager 504 is utilized to digitally image either monochromatic or CMYK process colors on the back of the ticket. Next, a subsequent series of flexographic print stations 505 prints the upper security layers as well as, in this embodiment, any decorative overprint. At this point, the web would can be rewound into a roll 506 for storage and ultimate processing by a separate packaging line.

The alternate press 535 shown in FIG. 5B is a similar hybrid press with the addition of a third process color imager 532 for digitally imaging the overprint (area on top of the SOC). As above, the press 525 unravels its paper web substrate from a roll 501' and flexographically prints 502' lower security layers in the scratch-off area as well as optional primer. Again, the press web enters a secured imager room where the front game play variable indicia and display and/or base backgrounds are applied by imager 503', which as shown in magnified view 526 may image process colors with CMYK (527, 528, 529, and 530—respectively). Imager 504' (shown magnified in 533) is then utilized to digitally image CMYK process colors (534, 535, 536, and 537—respectively) on the back of the ticket. Next, as above, a subsequent series of flexographic print stations 505' print the upper security layers; however, in embodiment 525 a third digital imager 532 (shown magnified in 538) images a CMYK (539, 540, 541, and 542) OP on top of the SOC with static printing plate station 531 optionally providing a clear glossy varnish on top of the OP and/or display for added esthetics. Finally, the web can be rewound into a roll 506' for storage and ultimate processing by a separate packaging line.

It should be appreciated that in certain embodiments of the present disclosure, if a third imager is provided to implement the display background to be visible on unplayed tickets, the third imager can only be utilize to print the OP and not the OP and the visible display background since third imager 532 is a separate physical imager than the variable indicia imager 503' and any misprint associated with the variable indicia would not manifest itself in the display background portion printed by third imager 532. Alternatively, the present disclosure could be implemented with the third imager 532 printing only the OP assuming the display and/or base background is printed by the variable indicia imager 503'.

The process color imagers shown in FIGS. 5A and 5B represent just two example embodiments of the present disclosure with other embodiments possible in various circumstances. For example, high-resolution monochromatic digital imagers can be employed for the back of the ticket instead of process color imagers, thereby resulting in a cost savings.

The present disclosure contemplates other variations of the disclosed embodiments (such as monochromatic color indicia where the monochromatic color is utilized as a component color in a process color display background).

Various changes and modifications to the present embodiments described herein will be apparent to those skilled in the art. For example, a description of an embodiment with several components in communication with each other does not imply that all such components are required, or that each of the disclosed components must communicate with every other component. On the contrary a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

What is claimed is:

1. A lottery ticket comprising:

a substrate having opposing side edges and opposing end edges;

first variable indicia printed on a first area of the substrate, the first variable indicia comprising a plurality of different component colors printed by a printer;

second variable indicia printed on a second area of the substrate adjacent to the first variable indicia, the second variable indicia comprising the plurality different component colors except for a first one of the component colors of the plurality of different component colors due to a component color printing error by the printer;

a first background printed on the substrate in a third area of the substrate adjacent to the first variable indicia and extending outside a border of the first area, the third area being in a first straight line on the substrate with the first area, the first straight line being parallel to the side edges of the substrate, the first background comprising: (a) the plurality of different component colors, and (b) an additional component color not present in the first variable indicia or the second variable indicia, wherein the additional component color is different than each of the plurality of different component colors, wherein the plurality of different component colors and the additional component are configured to form background artwork in the third area, wherein for each of the different component colors of the first variable indicia, the first background comprises a same corresponding component color printed by the printer at a saturation level of at least 5%;

a second background partially printed on the substrate in a fourth area on the substrate adjacent to the first background and adjacent to the second area and extending outside a border of the second area, the fourth area being in a second straight line on the substrate with the second area, the second straight line being parallel to the side edges of the substrate, the second background comprising: (a) the plurality of different component colors except for the first component color due to the same component color printing error by the printer, and (b) the additional component color not present within the first variable indica or the second variable indicia, wherein the plurality of different component colors and the additional component color are configured to form background artwork in the fourth area, wherein the component color printing error is a continuous component color printing error caused by the printer for the second variable indicia and the second background; and a scratch-off coating covering the first variable indicia and the second variable indicia;

wherein the second background is not covered by any scratch-off coating.

2. The lottery ticket of claim 1, wherein the continuous component color printing error is a process color misprint.

3. The lottery ticket of claim 1, wherein the additional component color of the first background and the second background that is not present in the first variable indicia or the second variable indicia is printed with a saturation of less than 5%.

4. A lottery ticket comprising:

a substrate having opposing side edges and opposing end edges;

variable indicia printed on a first area of the substrate, the variable indicia comprising a plurality of different component colors printed by a first printer;

a background printed on a second area of the substrate adjacent to the first area and outside of a border of the first area, the background comprising: (a) for each of the plurality of different component colors of the variable indicia printed by the first printer on the first area of the substrate, a same corresponding component color printed by the first printer at a saturation level of at least 5%, and (b) an additional component color not present in the variable indicia printed with a saturation of less than 5% by the first printer, wherein the additional component color is different than each of the plurality of different component colors, wherein the first plurality of different component colors and the additional component form background artwork in the second area, wherein the plurality of different component colors of the variable indicia printed by the first printer and the additional component color are all aligned in a straight line parallel to the side edges of the substrate such that a continuous printing error by the first printer of not printing a first one of the component colors of the plurality of different component colors in the first area would extend in a straight line parallel to the side edges of the substrate into the background on the second area but would not affect the additional component of the background; and a scratch-off coating covering the variable indicia.

5. The lottery ticket of claim 4, wherein a portion of the background is not covered by the scratch-off coating.

6. The lottery ticket of claim 4, wherein the background is covered by the scratch-off coating.

7. A lottery ticket comprising:

a substrate having opposing side edges and opposing end edges;

variable indicia printed on a first area of the substrate, the variable indicia comprising a first plurality of different component colors printed by a first printer;

a scratch-off coating covering the variable indicia; and a display background printed on a second area of the substrate that is outside of a border of the first area, the display background comprising: (a) for each of the first plurality of different component colors of the variable indicia printed by the first printer, a same component color printed at a saturation level of at least 5% by the first printer in a straight line with said component color printed by the first printer in the first area, and (b) an additional component color not present in the variable indicia printed with a saturation of less than 5% by the first printer in the straight line, wherein the additional component color is different than each of the first plurality of different component colors, wherein the straight line is parallel to the side edges of the substrate, wherein the display background is not covered by any scratch off coating, and wherein a continuous printing error by the first printer of not printing a first one of the component colors of the plurality of component colors would extend from the variable indicia into the display background and would not affect the additional component of the display background, and wherein the first plurality of different component colors and the additional component form background artwork in the second area.

* * * * *